United States Patent
Ratnam et al.

(10) Patent No.: US 11,343,748 B2
(45) Date of Patent: May 24, 2022

(54) COORDINATED BEAM SELECTION IN CELLULAR MESH NETWORK

(71) Applicant: Samsung Electronics Co., Ltd., Suwon-si (KR)

(72) Inventors: Vishnu Vardhan Ratnam, Plano, TX (US); Jeongho Jeon, San Jose, CA (US); Joonyoung Cho, Portland, OR (US)

(73) Assignee: Samsung Electronics Co., Ltd., Suwon-si (KR)

( * ) Notice: Subject to any disclaimer, the term of this patent is extended or adjusted under 35 U.S.C. 154(b) by 14 days.

(21) Appl. No.: 16/783,918

(22) Filed: Feb. 6, 2020

(65) Prior Publication Data
US 2020/0260358 A1 Aug. 13, 2020

Related U.S. Application Data

(60) Provisional application No. 62/802,944, filed on Feb. 8, 2019.

(51) Int. Cl.
*H04W 40/16* (2009.01)
*H04W 48/16* (2009.01)
(Continued)

(52) U.S. Cl.
CPC .......... *H04W 40/16* (2013.01); *H04B 7/0695* (2013.01); *H04W 16/28* (2013.01);
(Continued)

(58) Field of Classification Search
CPC ..... H04W 8/005; H04W 24/02; H04W 40/28; H04W 40/246; H04W 52/383; H04W 64/003; H04W 56/009
(Continued)

(56) References Cited

U.S. PATENT DOCUMENTS 7,330,694 B2 * 2/2008 Lee .................. H04W 40/28
455/446
7,519,366 B2 4/2009 Guo et al.
(Continued)

FOREIGN PATENT DOCUMENTS

EP 1614235 B1 3/2018
EP 3509364 B1 * 12/2020 .......... H04W 52/243
(Continued)

OTHER PUBLICATIONS 802.16q-2015—IEEE Standard for Air Interface for Broadband Wireless Access Systems—Amendment 3: Multi-tier Networks Date of Publication: Mar. 16, 2015 (Year: 2015).*
(Continued)

*Primary Examiner* — William D Cumming

(57) ABSTRACT

Methods and apparatuses for maintaining network information. A method for operating a base station (BS) in a wireless communication network includes receiving a neighbor discovery signal block (NDSB) from a neighbor BS in the wireless communication network, generating measurement information based on the NDSB, and generating a path metric for the neighbor BS based on the generated measurement information. The method further includes determining whether the neighbor BS as an interferer neighbor BS based on comparison of the path metric to a threshold and updating network information maintained at the BS based on the determination of whether the neighbor BS is the interferer neighbor BS.

20 Claims, 16 Drawing Sheets

(51) Int. Cl.
*H04W 16/28* (2009.01)
*H04W 76/11* (2018.01)
*H04B 7/06* (2006.01)
*H04W 24/10* (2009.01)

(52) U.S. Cl.
CPC ........... *H04W 24/10* (2013.01); *H04W 48/16* (2013.01); *H04W 76/11* (2018.02)

(58) Field of Classification Search
USPC .............................. 370/351, 328; 455/522, 7
See application file for complete search history.

(56) References Cited

U.S. PATENT DOCUMENTS

| | | | | |
|---|---|---|---|---|
| 9,232,460 | B2* | 1/2016 | Zhu | H04W 40/246 |
| 9,262,347 | B2* | 2/2016 | Harriman | G06F 13/00 |
| 9,622,064 | B2* | 4/2017 | Zhu | H04W 52/383 |
| 9,743,254 | B2* | 8/2017 | Friday | H04B 17/373 |
| 9,949,227 | B2* | 4/2018 | Hansen | H04W 64/003 |
| 9,980,160 | B2 | 5/2018 | Tilly et al. | |
| 10,217,120 | B1* | 2/2019 | Shin | G01S 5/0263 |
| 10,231,208 | B2 | 3/2019 | Agiwal et al. | |
| 10,485,054 | B2* | 11/2019 | Tenny | H04B 7/086 |
| 11,019,515 | B1* | 5/2021 | Sun | H04W 24/08 |
| 11,166,294 | B2* | 11/2021 | Sirkka | H04W 72/1231 |
| 2005/0073992 | A1* | 4/2005 | Lee | H04W 40/28 370/351 |
| 2007/0116099 | A1* | 5/2007 | Banister | H04B 1/71075 375/E1.031 |
| 2009/0059851 | A1 | 3/2009 | Weil et al. | |
| 2013/0142136 | A1 | 6/2013 | Pi et al. | |
| 2014/0269494 | A1* | 9/2014 | Zhu | H04W 40/246 370/328 |
| 2014/0274192 | A1* | 9/2014 | Zhu | H04W 52/367 455/522 |
| 2015/0109943 | A1 | 4/2015 | Sahin et al. | |
| 2015/0373618 | A1 | 12/2015 | Deenoo et al. | |
| 2016/0323717 | A1* | 11/2016 | Friday | H04B 17/373 |
| 2017/0064583 | A1 | 3/2017 | Roy et al. | |
| 2017/0347391 | A1* | 11/2017 | Tenny | H04B 7/086 |
| 2018/0063827 | A1 | 3/2018 | Soysal et al. | |
| 2019/0174385 | A1* | 6/2019 | Sang | H04W 76/19 |
| 2020/0221373 | A1* | 7/2020 | Jeon | H04W 48/16 |
| 2020/0260358 | A1* | 8/2020 | Ratnam | H04B 7/0695 |
| 2020/0260469 | A1* | 8/2020 | Sirkka | H04W 72/1231 |
| 2020/0295565 | A1* | 9/2020 | Dudding | H02J 3/14 |
| 2021/0282116 | A1* | 9/2021 | Balasubramanian | H04W 72/0406 |

FOREIGN PATENT DOCUMENTS

| | | | | |
|---|---|---|---|---|
| KR | 10-2018-0133737 A | 12/2018 | | |
| KR | 10-2019-0010724 A | 1/2019 | | |
| WO | WO-2020162722 A1 * | 8/2020 | ............ | H04B 7/024 |
| WO | WO-2020190052 A1 * | 9/2020 | .......... | H04W 56/009 |

OTHER PUBLICATIONS

K.-H. Chi, J. Morris Chang and T.-C. Wang, "Enhanced Fast Base Station Switching," in IEEE Transactions on Mobile Computing, vol. 11, No. 11, pp. 1640-1651, Nov. 2012, doi: 10.1109/TMC.2011.208. (Year: 2012).*

International Search Report and Written Opinion of the International Searching Authority in connection with International Application No. PCT/KR2020/001792 dated May 14, 2020, 10 pages.

NTT Docomo, Inc., "Discussion on multi-beam enhancement", R1-1900979, 3GPP TSG RAN WG1 Ad-Hoc Meeting 1901, Taipei, Jan. 21-25, 2019, 19 pages.

Extended European Search Report dated Dec. 10, 2021 regarding Application No. 20752473.7, 11 pages.

\* cited by examiner

COORDINATED BEAM SELECTION IN CELLULAR MESH NETWORK

CROSS-REFERENCE TO RELATED APPLICATIONS AND CLAIM OF PRIORITY

The present application claims priority to U.S. Provisional Patent Application No. 62/802,944, filed on Feb. 8, 2019. The content of the above-identified patent document is incorporated herein by reference.

TECHNICAL FIELD

The present application relates generally to wireless communication systems, more specifically, the present disclosure relates to beam selection coordination in cellular mesh networks.

BACKGROUND

A communication system includes a downlink (DL) that conveys signals from transmission points such as base stations (BSs) to reception points such as user equipments (UEs) and an uplink (UL) that conveys signals from transmission points such as UEs to reception points such as BSs. Increasing the deployment density of BSs is a way to increase data throughputs, via spatial reuse of frequencies. In fact, such spatial reuse has been one of the main contributors for increase in system throughput since the early days of cellular communication. While improving spatial reuse, a dense BS deployment may be inevitable at millimeter wave (mm-wave) and terahertz (THz) frequencies to improve coverage, by compensating for the pathloss and blockage. However, the deployment locations and density of conventional BSs is limited by the availability of expensive fiber backhaul.

SUMMARY

The present disclosure relates to coordinated beam selection in cellular mesh networks.

In one embodiment, a method for operating a BS in a wireless communication network is provided. The method includes receiving a neighbor discovery signal block (NDSB) from a neighbor BS in the wireless communication network, generating measurement information based on the NDSB, and generating a path metric for the neighbor BS based on the generated measurement information. The method further includes determining whether the neighbor BS is an interferer neighbor BS based on comparison of the path metric to a threshold and updating network information maintained at the BS based on the determination of whether the neighbor BS is the interferer neighbor BS.

In another embodiment, a BS in a wireless communication network is provided. The BS includes a transceiver configured to receive a NDSB from a neighbor BS in the wireless communication network and a processor operably connected to the transceiver. The processor is configured to generate measurement information based on the NDSB, generate a path metric for the neighbor BS based on the generated measurement information, determine whether the neighbor BS is an interferer neighbor BS based on comparison of the path metric to a threshold, and update network information maintained at the BS based on the determination of whether the neighbor BS is the interferer neighbor BS.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIG. 1 through FIG. 19, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Figure 1:
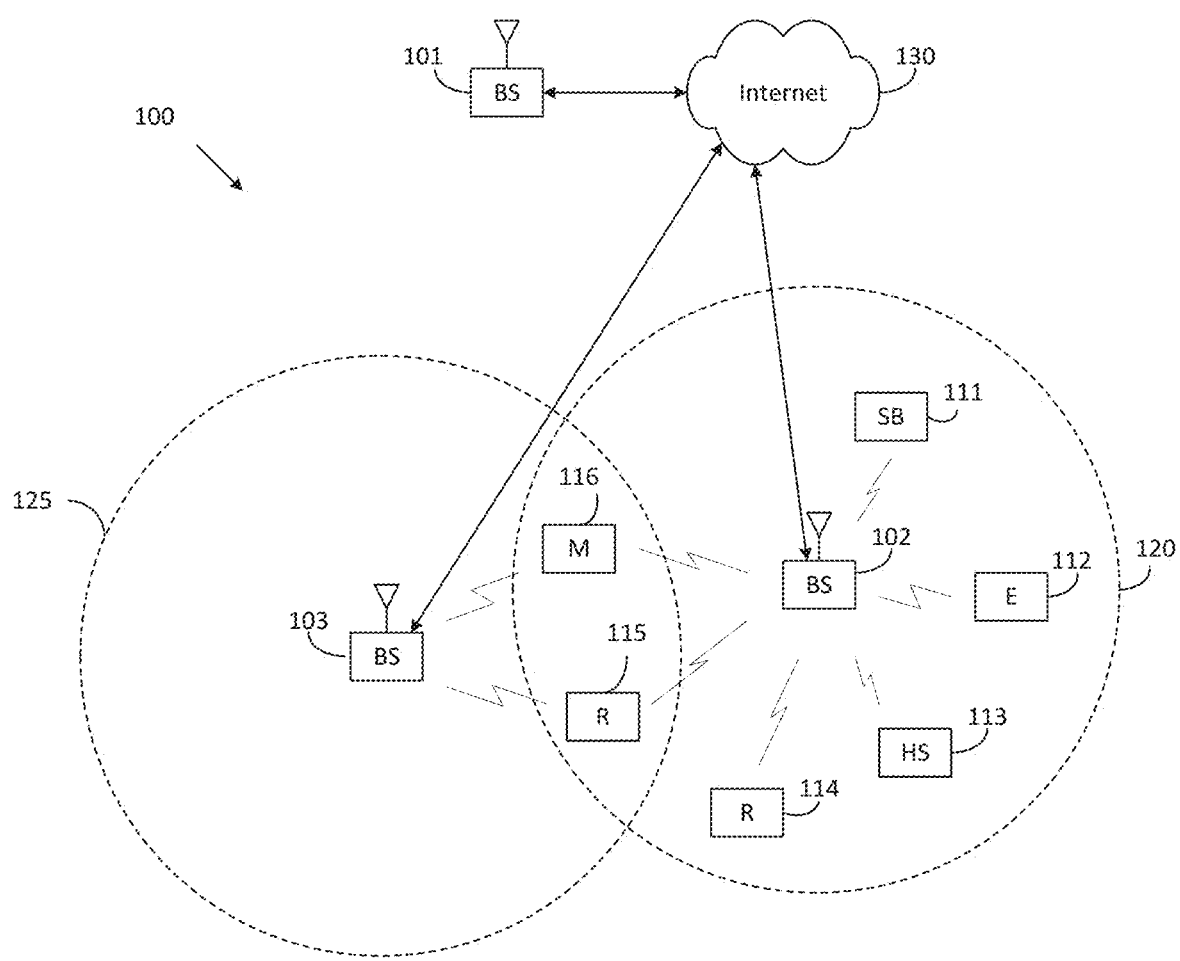
FIG. 1 illustrates an example wireless network according to embodiments of the present disclosure.
Figure 2:
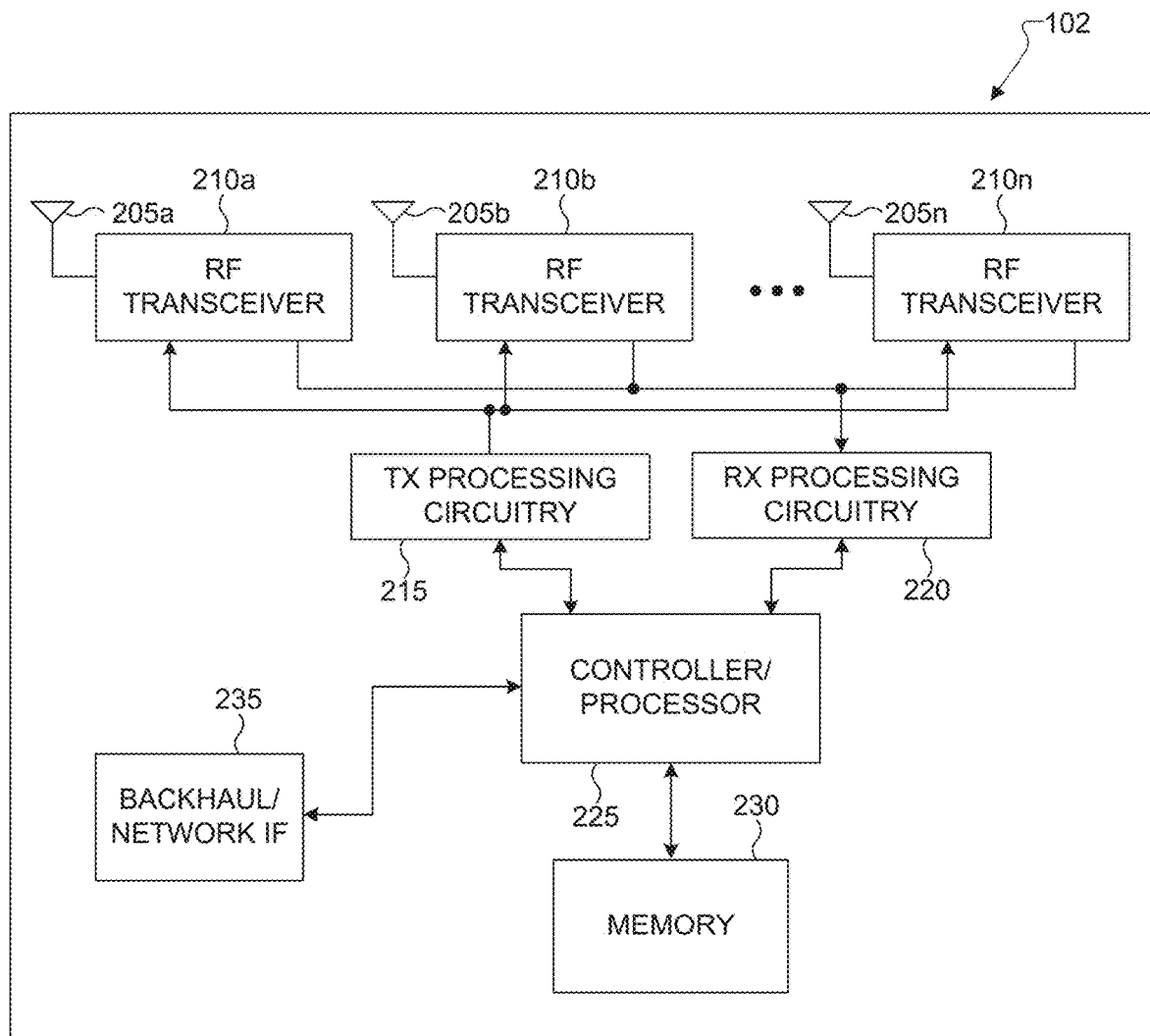
FIG. 2 illustrates an example gNB according to embodiments of the present disclosure.
Figure 3:
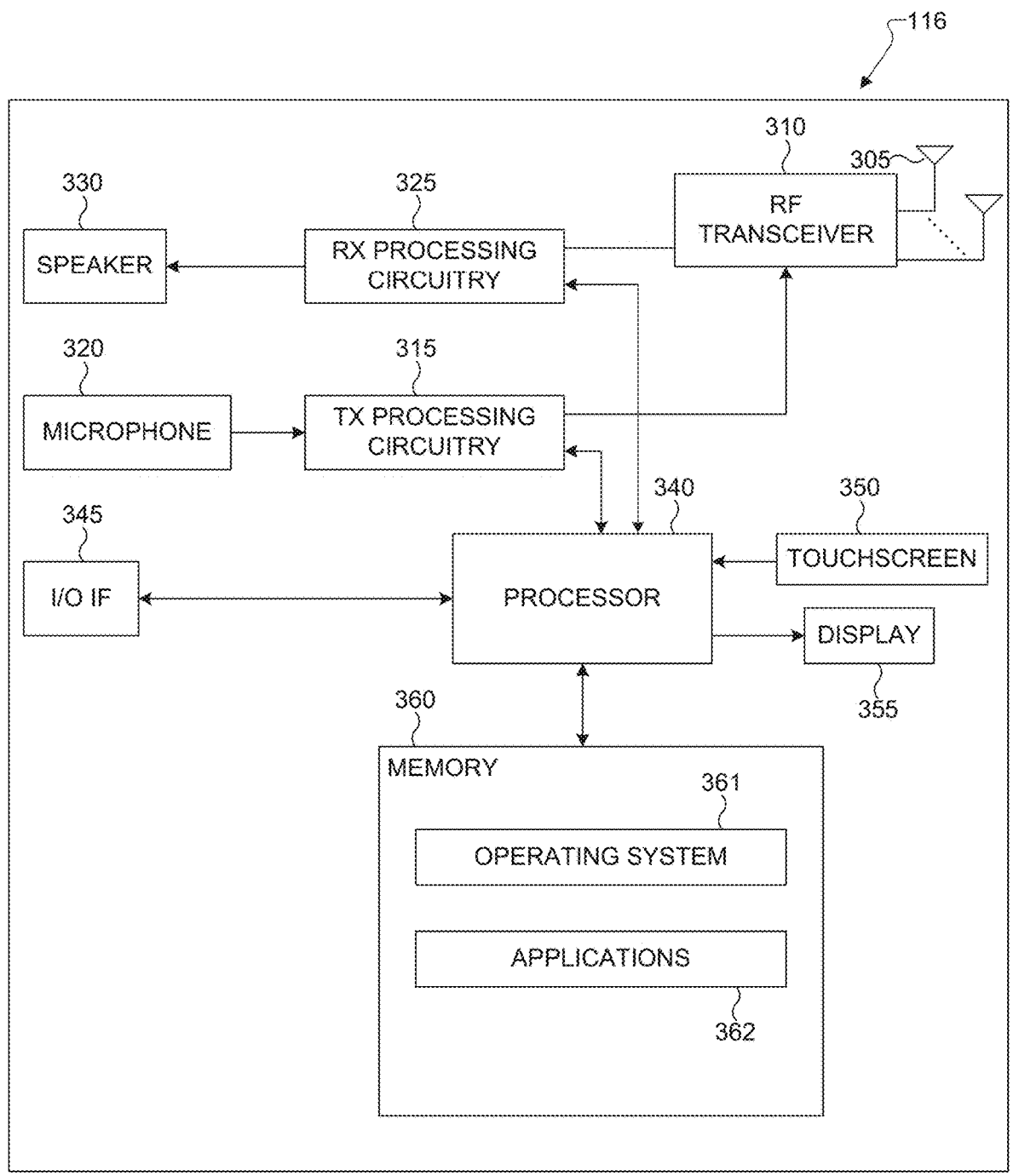
FIG. 3 illustrates an example UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of the present disclosure.

As shown in FIG. 1, the wireless network includes a gNB 101, a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for reception reliability for data and control information in an advanced wireless communication system. In certain embodiments, and one or more of the gNBs 101-103 includes circuitry, programing, or a combination thereof, for efficient coordinated beam selection in a cellular mesh network.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of the present disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of the gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of the present disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for beam management. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of the UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

To meet the demand for wireless data traffic having increased since deployment of 4G communication systems, efforts have been made to develop an improved 5G or pre-5G communication system. Therefore, the 5G or pre-5G communication system is also called a "beyond 4G network" or a "post LTE system." The 5G communication system is considered to be implemented in higher frequency (mmWave) bands, e.g., 60 GHz bands, so as to accomplish higher data rates. To decrease propagation loss of the radio waves and increase the transmission distance, the beam-forming, massive multiple-input multiple-output (MIMO), full dimensional MIMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

A time unit for DL signaling or for UL signaling on a cell is referred to as a slot and can include one or more symbols. A symbol can also serve as an additional time unit. A frequency (or bandwidth (BW)) unit is referred to as a resource block (RB). One RB includes a number of sub-carriers (SCs). For example, a slot can include 14 symbols, have duration of 1 millisecond or 0.5 milliseconds, and an RB can have a BW of 180 kHz or 360 kHz and include 12 SCs with inter-SC spacing of 15 kHz or 30 kHz, respectively.

DL signals include data signals conveying information content, control signals conveying DL control information (DCI) formats, and reference signals (RS) that are also known as pilot signals. A gNB can transmit data information (e.g., transport blocks) or DCI formats through respective physical DL shared channels (PDSCHs) or physical DL control channels (PDCCHs). A gNB can transmit one or more of multiple types of RS including channel state information RS (CSI-RS) and demodulation RS (DMRS). A CSI-RS is intended for UEs to measure channel state information (CSI) or to perform other measurements such as ones related to mobility support. A DMRS can be transmitted only in the BW of a respective PDCCH or PDSCH and a UE can use the DMRS to demodulate data or control information.

UL signals also include data signals conveying information content, control signals conveying UL control information (UCI), and RS. A UE transmits data information (e.g., transport blocks) or UCI through a respective physical UL shared channel (PUSCH) or a physical UL control channel (PUCCH). When a UE simultaneously transmits data information and UCI, the UE can multiplex both in a PUSCH or transmit them separately in respective PUSCH and PUCCH. UCI includes hybrid automatic repeat request acknowledgement (HARQ-ACK) information, indicating correct or incorrect detection of data transport blocks (TBs) by a UE, scheduling request (SR) indicating whether a UE has data in the UE's buffer, and CSI reports enabling a gNB to select appropriate parameters to perform link adaptation for PDSCH or PDCCH transmissions to a UE.

A CSI report from a UE can include a channel quality indicator (CQI) informing a gNB of a modulation and coding scheme (MCS) for the UE to detect a data TB with a predetermined block error rate (BLER), such as a 10% BLER, of a precoding matrix indicator (PMI) informing a gNB how to precode signaling to a UE, and of a rank indicator (RI) indicating a transmission rank for a PDSCH. UL RS includes DMRS and sounding RS (SRS). DMRS is transmitted only in a BW of a respective PUSCH or PUCCH transmission. A gNB can use a DMRS to demodulate information in a respective PUSCH or PUCCH. SRS is transmitted by a UE to provide a gNB with UL CSI and, for a TDD or a flexible duplex system, to also provide a PMI for DL transmissions. An UL DMRS or SRS transmission can be based, for example, on a transmission of a Zadoff-Chu (ZC) sequence or, in general, of a CAZAC sequence.

DL transmissions and UL transmissions can be based on an orthogonal frequency division multiplexing (OFDM) waveform including a variant using DFT precoding that is known as DFT-spread-OFDM.

Figure 4:
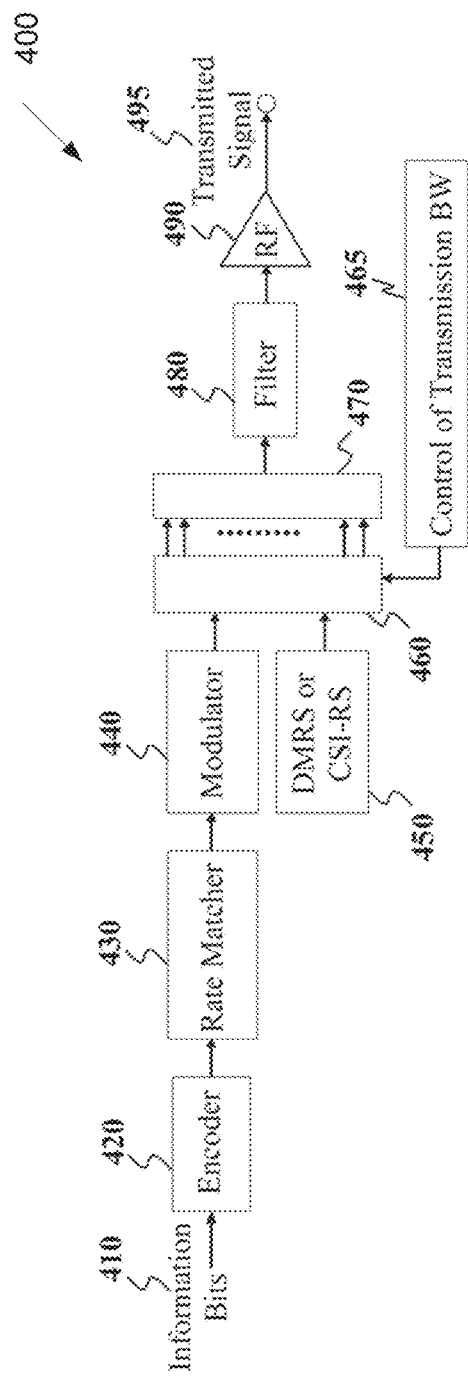
FIG. 4 illustrates an example transmitter structure using OFDM according to embodiments of the present disclosure.

FIG. 4 illustrates an example transmitter structure 400 using OFDM according to embodiments of the present disclosure. For example, the transmitter structure 400 may be implemented in the UE 116 or the gNB 102. An embodiment of the transmitter structure 400 shown in FIG. 4 is for illustration only. One or more of the components illustrated in FIG. 4 can be implemented in specialized circuitry configured to perform the noted functions or one or more of the components can be implemented by one or more processors executing instructions to perform the noted functions. Other embodiments are used without departing from the scope of the present disclosure.

Information bits, such as DCI bits or data bits 410, are encoded by encoder 420, rate matched to assigned time/frequency resources by rate matcher 430 and modulated by modulator 440. Subsequently, modulated encoded symbols and DMRS or CSI-RS 450 are mapped to SCs 460 by SC mapping circuit 465, an inverse fast Fourier transform (IFFT) is performed by filter 470, a cyclic prefix (CP) is added by CP insertion circuit 480, and a resulting signal is filtered by filter 490 and transmitted by an radio frequency (RF) circuit 495.

Figure 5:
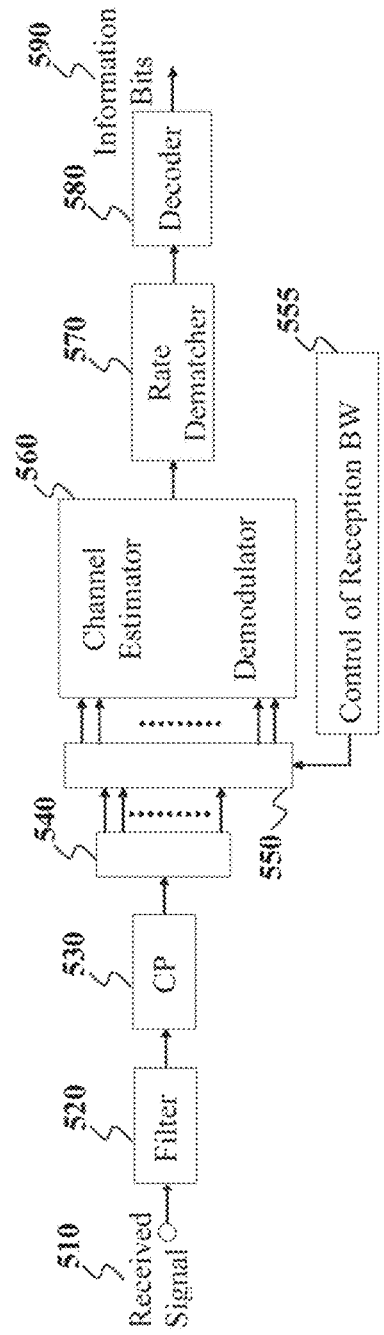
FIG. 5 illustrates an example receiver structure using OFDM according to embodiments of the present disclosure.

FIG. 5 illustrates an example receiver structure 500 using OFDM according to embodiments of the present disclosure. For example, the receiver structure 500 may be implemented in the UE 116 or the gNB 102. An embodiment of the receiver structure 500 shown in FIG. 5 is for illustration only. One or more of the components illustrated in FIG. 8 can be implemented in specialized circuitry configured to perform the noted functions or one or more of the components can be implemented by one or more processors executing instructions to perform the noted functions. Other embodiments are used without departing from the scope of the present disclosure.

A received signal 510 is filtered by filter 520, a CP removal circuit removes a CP 530, a filter 540 applies a fast Fourier transform (FFT), SCs de-mapping circuit 550 de-maps SCs selected by BW selector circuit 555, received symbols are demodulated by a channel estimator and a demodulator circuit 560, a rate de-matcher 570 restores a rate matching, and a decoder 580 decodes the resulting bits to provide information bits 590.

A UE typically monitors multiple candidate locations for respective potential PDCCH transmissions to decode multiple candidate DCI formats in a slot. Monitoring a PDCCH candidates means receiving and decoding the PDCCH candidate according to DCI formats the UE is configured to receive. A DCI format includes cyclic redundancy check (CRC) bits in order for the UE to confirm a correct detection of the DCI format. A DCI format type is identified by a radio network temporary identifier (RNTI) that scrambles the CRC bits. For a DCI format scheduling a PDSCH or a PUSCH to a single UE, the RNTI can be a cell RNTI (C-RNTI) and serves as a UE identifier.

For a DCI format scheduling a PDSCH conveying system information (SI), the RNTI can be an SI-RNTI. For a DCI format scheduling a PDSCH providing a random-access response (RAR), the RNTI can be an RA-RNTI. For a DCI format scheduling a PDSCH or a PUSCH to a single UE prior to a UE establishing a radio resource control (RRC) connection with a serving gNB, the RNTI can be a temporary C-RNTI (TC-RNTI). For a DCI format providing TPC commands to a group of UEs, the RNTI can be a TPC-PUSCH-RNTI or a TPC-PUCCH-RNTI. Each RNTI type can be configured to a UE through higher-layer signaling such as RRC signaling. A DCI format scheduling PDSCH transmission to a UE is also referred to as DL DCI format or DL assignment while a DCI format scheduling PUSCH transmission from a UE is also referred to as UL DCI format or UL grant.

A PDCCH transmission can be within a set of physical RBs (PRBs). A gNB can configure a UE one or more sets of PRBs, also referred to as control resource sets, for PDCCH receptions. A PDCCH transmission can be in control channel elements (CCEs) that are included in a control resource set. A UE determines CCEs for a PDCCH reception based on a search space such as a UE-specific search space (USS) for PDCCH candidates with DCI format having CRC scrambled by a RNTI, such as a C-RNTI, that is configured to the UE by UE-specific RRC signaling for scheduling PDSCH reception or PUSCH transmission, and a common search space (CSS) for PDCCH candidates with DCI formats having CRC scrambled by other RNTIs. A set of CCEs that can be used for PDCCH transmission to a UE define a PDCCH candidate location. A property of a control resource set is transmission configuration indication (TCI) state that provides quasi co-location information of the DMRS antenna port for PDCCH reception.

Figure 6:
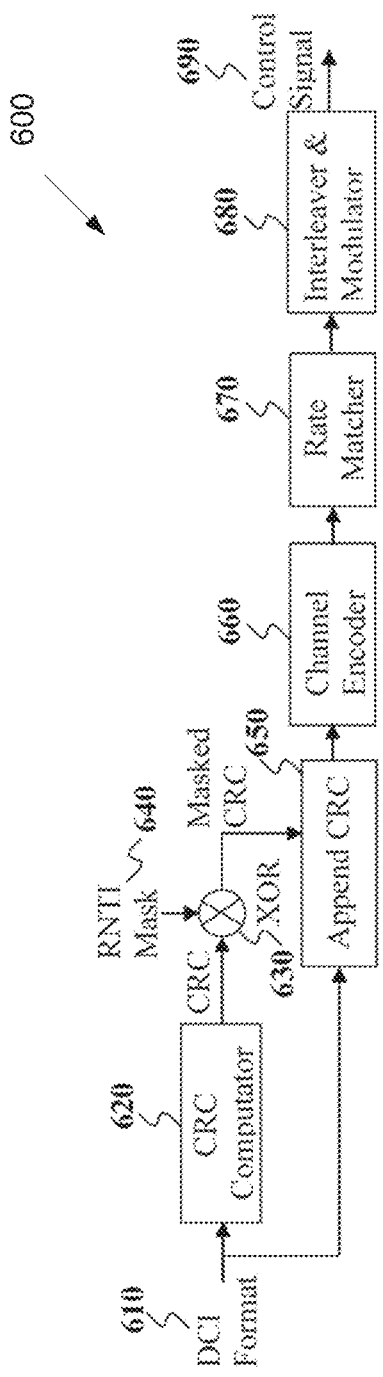
FIG. 6 illustrates an example encoding process for a DCI format according to embodiments of the present disclosure.

FIG. 6 illustrates an example encoding process 600 for a DCI format according to embodiments of the present disclosure. For example, the encoding process 600 may be implemented in the gNB 102. An embodiment of the encoding process 600 shown in FIG. 6 is for illustration only. One or more of the components illustrated in FIG. 6 can be implemented in specialized circuitry configured to perform the noted functions or one or more of the components can be implemented by one or more processors executing instructions to perform the noted functions. Other embodiments are used without departing from the scope of the present disclosure.

A gNB separately encodes and transmits each DCI format in a respective PDCCH. A RNTI masks a CRC of the DCI format codeword in order to enable the UE to identify the DCI format. For example, the CRC and the RNTI can include, for example, 16 bits or 24 bits. The CRC of (non-coded) DCI format bits 610 is determined using a CRC computation circuit 620, and the CRC is masked using an exclusive OR (XOR) operation circuit 630 between CRC bits and RNTI bits 640. The XOR operation is defined as XOR (0,0)=0, XOR (0,1)=1, XOR (1,0)=1, XOR (1,1)=0. The masked CRC bits are appended to DCI format information bits using a CRC append circuit 650. An encoder 660 performs channel coding (such as tail-biting convolutional coding or polar coding), followed by rate matching to allocated resources by rate matcher 670. Interleaving and modulation circuits 680 apply interleaving and modulation, such as QPSK, and the output control signal 690 is transmitted.

Figure 7:
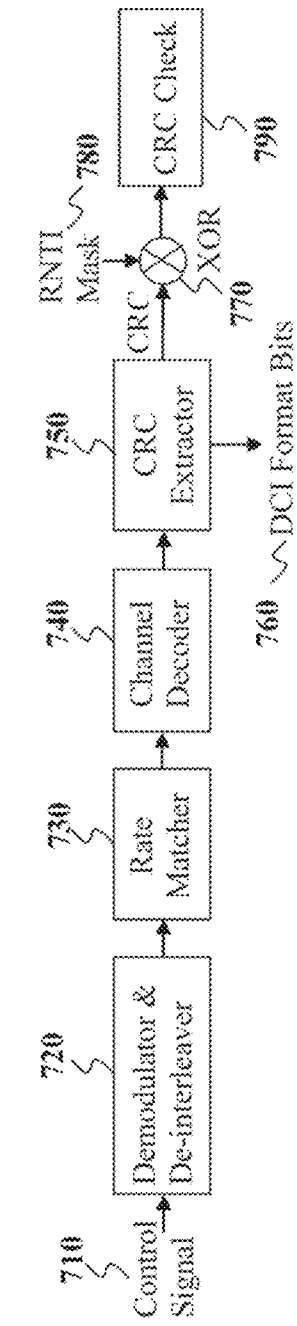
FIG. 7 illustrates an example decoding process for a DCI format for use with a UE according to embodiments of the present disclosure.

FIG. 7 illustrates an example decoding process 700 for a DCI format for use with a UE according to embodiments of the present disclosure. For example, the decoding process 700 may be implemented in the UE 116. An embodiment of the decoding process 700 shown in FIG. 7 is for illustration only. One or more of the components illustrated in FIG. 7 can be implemented in specialized circuitry configured to perform the noted functions or one or more of the components can be implemented by one or more processors executing instructions to perform the noted functions. Other embodiments are used without departing from the scope of the present disclosure.

A received control signal 710 is demodulated and de-interleaved by a demodulator and a de-interleaver 720. A rate matching applied at a gNB transmitter is restored by rate matcher 730, and resulting bits are decoded by decoder 740. After decoding, a CRC extractor 750 extracts CRC bits and provides DCI format information bits 760. The DCI format information bits are de-masked 770 by an XOR operation with an RNTI 780 (when applicable) and a CRC check is performed by circuit 790. When the CRC check succeeds (check-sum is zero), the DCI format information bits are considered to be valid. When the CRC check does not succeed, the DCI format information bits are considered to be invalid.

Increasing the deployment density of BSs is a way to increase data throughputs, via spatial reuse of frequencies. In fact, such spatial reuse has been one of the main contributors for increase in system throughput since the early days of cellular communication. While improving spatial reuse, a dense BS deployment may be inevitable at millimeter wave (mm-wave) and terahertz (THz) frequencies to improve coverage, by compensating for the pathloss and blockage. However, the deployment locations and density of conventional BSs is limited by the availability of expensive fiber backhaul.

Figure 8:
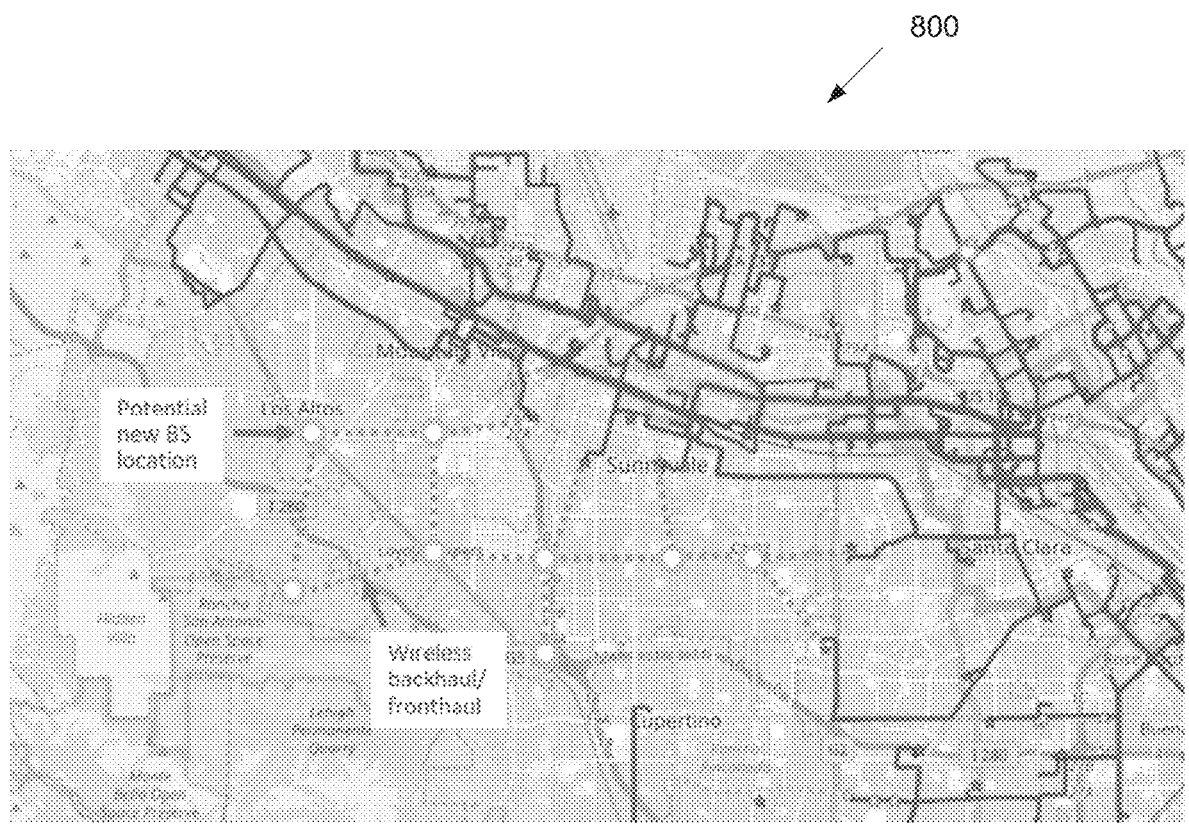
FIG. 8 illustrates an example fiber and BS deployment according to embodiments of the present disclosure.

FIG. 8 illustrates an example fiber and BS deployment 800 according to embodiments of the present disclosure. The embodiment of the fiber and BS deployment 800 illustrated in FIG. 8 is for illustration only. FIG. 8 does not limit the scope of the present disclosure to any particular implementation.

As an illustration, FIG. 8 shows a typical fiber and BS deployment in an urban area. An effective way to "unleash" the BS deployment from fiber and provide improved coverage and better deployment density without additional expensive fiber deployment, is by using wireless backhaul for the BSs. To be most effective, such BSs may be capable of establishing one or more backhaul paths to the fiber network, with each path encompassing one or more wireless links as illustrated in FIG. 8 i.e., multi-connectivity and multi-hop functionality can be supported. A deployed network with such capabilities is referred to as a wireless mesh network.

Figure 9:
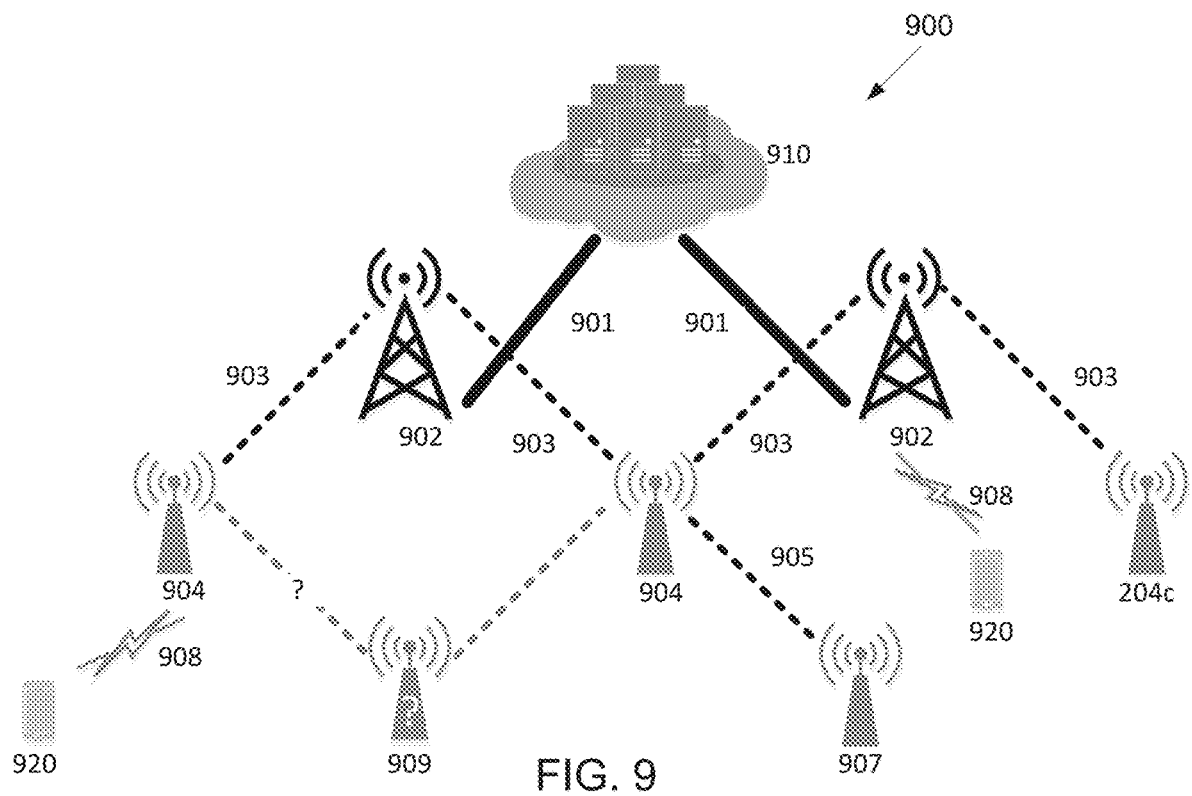
FIG. 9 illustrates an example multi-hop wireless backhaul mesh network according to embodiments of the present disclosure.

FIG. 9 illustrates an example multi-hop wireless backhaul mesh network 900 according to embodiments of the present disclosure. The embodiment of the multi-hop wireless backhaul mesh network 900 illustrated in FIG. 9 is for illustration only. FIG. 9 does not limit the scope of the present disclosure to any particular implementation.

An illustrative example of a multi-hop wireless mesh network 900 is provided in FIG. 9. The network 900 includes a plurality of BS 902, 904, 907, and 909, which may be examples of gNB 102, and a plurality of UEs 920, which may be examples of UE 116. Referring to FIG. 9, a gateway BS 902 may be connected to the core network 910 by a fiber/wired backhaul link 901. Similarly, a mesh BS 904 may be connected to a gateway BS 902 via a wireless interface 903, and a mesh BS 907 may be wirelessly connected to a mesh BS 904 via a wireless interface 905. A UE 920 can be connected either to a mesh BS or to a gateway BS via a wireless access link 908. The downlink backhaul traffic to a mesh BS 904 can be routed from the core network 910 to a gateway BS 902 through fiber/wired backhaul interface 901 and then transmitted to the BS 904 (e.g., mesh BS(s)) through the wireless interface 903.

The uplink backhaul traffic from the mesh BS 904 may be transmitted through the wireless interface 903 to the gateway BS 902 and then routed to the core network 910 by the fiber/wired backhaul interface 901. Similarly, the downlink backhaul traffic to the mesh BS 907 may be routed from the core network 910 to the gateway BS 902 via the wired interface 901, and then transmitted via the wireless interface 903 to the mesh BS 904 and then via wireless interface 905 to the mesh BS 907. The immediate previous hop BS that provides a mesh BS/UE connectivity to the core network is referred to as a parent BS.

The mesh BSs 904, 907 with already existing single hop (e.g., 903) or the multi-hop (e.g., 903-905) backhaul interface to the gateway BS 902 or the core network 910 is referred to as a connected mesh BS. Similarly, the mesh BS 909 that currently does not have a backhaul interface to the core network 910 is referred to as a new mesh BS. For an in-band operation, the BS-BS backhaul interfaces 903, 905, may re-use the same frequency resource as the BS-UE access links 908, while for out-of-band operation, both backhaul/fronthaul and access link may use different frequency resources. For centralized control case, the fronthaul/backhaul traffic routing decisions for the mesh network may be made by the gateway BS or another entity within the core network. For the decentralized control, each BS may make the fronthaul/backhaul traffic routing decisions by itself.

Due to the mobility of the mesh BSs or the scatterers, the channel conditions between the mesh BSs and/or gateway BSs may vary with time. Consequently, a procedure may be required for updating the network connectivity information for already connected mesh BSs and for enabling the discovery and connectivity of a new mesh BS to the core network. This can be accomplished by periodically transmitting a NDSB by the gateway/connected BSs.

In one embodiment, the NDSB may include one or more information elements (IEs), such as: (i) synchronization signals, such as a primary synchronization signal (PSS) and a secondary synchronization signal (SSS), (ii) an always-on reference signal (RS), (ii) a channel state information reference signal (CSI-RS), (iv) a Master information block (MIB) and (v) System information block (SIB). The PSS and SSS can help in timing/frequency synchronization, cell ID acquisition etc. to a new mesh BS.

The always-on RS can help radio resource management (RRM) measurements including measurement and/or computations of reference signal received power (RSRP), received signal strength indicator (RSSI), and reference signal received quality (RSRQ), etc at a new mesh BS or a mesh BS in radio resource control (RRC)-idle/connected states. In another embodiment, PSS or SSS can be used for RRM measurement. The CSI-RS can be used for channel estimation/CSI acquisition at the mesh BSs. Apart from the conventional information which is included in the MIB for 3GPP systems (e.g., NR or LTE), such as system frame number (SFN), SSB-subcarrier offset, CORESET/DMRS configuration for SIB scheduling, barring information etc., the suggested NDSB MIB may contain additional information such as: (a) mesh capability information, (b) gateway BS indication, (c) random access resource (d) routing information (e) hardware capability information (f) beam priority information (g) BS transmission pattern information etc.

Figure 11:
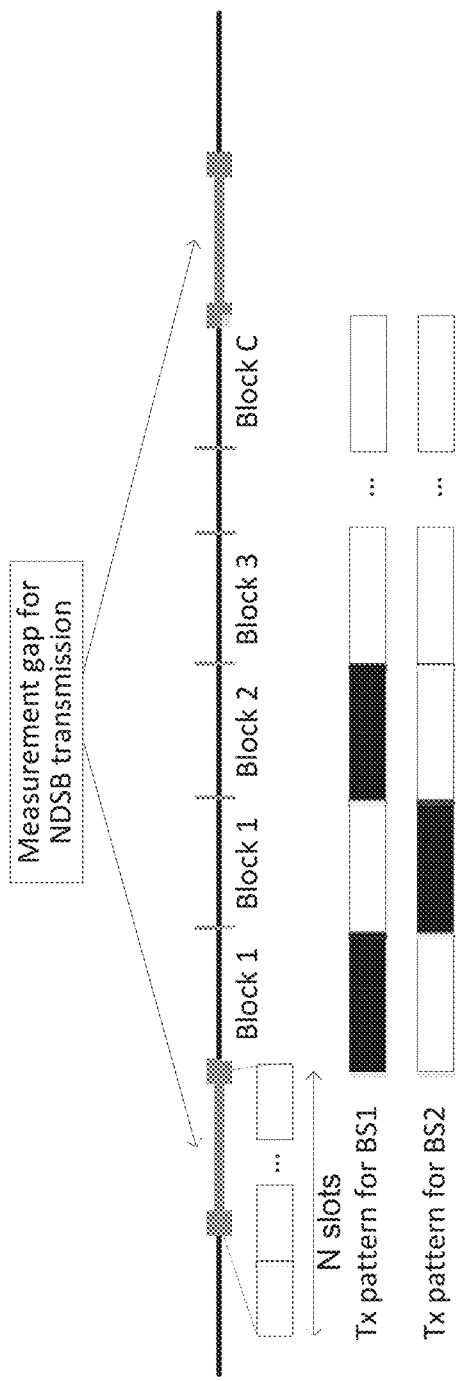
FIG. 11 illustrates an example transmission timing structure for dedicated measurement gap for NDSB transmissions according to embodiments of the present disclosure.

In another embodiment, one or more of these IEs (a-g) may be included in the NDSB SIB. Here the "transmission pattern" refers to a set of transmission rules that may be followed by the BS during the data transmission phase. For example, if the data transmission phase is divided into slots, such a pattern can hold information on which slots the BS is allowed to transmit and/or receive signals as illustrated in FIG. 11.

Note that the BS may decide to not use all transmission slots allocated in a pattern. Similarly the beam priority information is a transmit beam specific field that corresponds to the priority of the traffic that may be transmitted/received on that beam.

Figure 10:
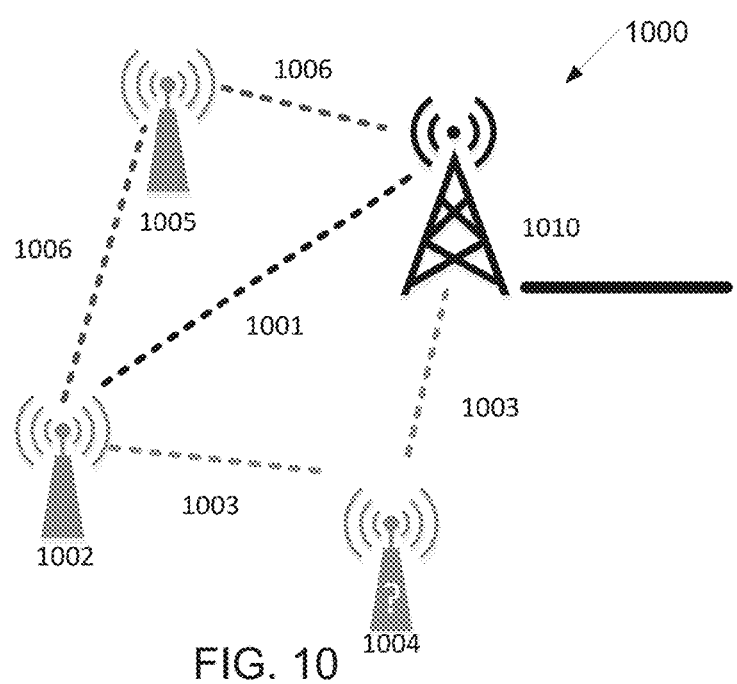
FIG. 10 illustrates an example of new mesh BS discovery in a wireless backhaul mesh network according to embodiments of the present disclosure.

FIG. 10 illustrates an example of new mesh BS discovery in a wireless backhaul mesh network 1000 according to embodiments of the present disclosure. For example, the wireless backhaul mesh network 1000 may be an example of one implementation of the wireless backhaul mesh network 900 in FIG. 9. The embodiment of the new mesh BS discovery 1000 illustrated in FIG. 10 is for illustration only. FIG. 10 does not limit the scope of the present disclosure to any particular implementation.

As illustrated in FIG. 10, a base station (e.g., 101-103 as illustrated in FIG. 1) may be implemented as a mesh BS and/or a gateway BS. A new mesh BS 1004 may use the NDSB to synchronize to a gateway BS 1010 or a connected mesh BS 1002, to perform channel measurement and beam alignment for establishing the corresponding wireless interfaces 1003, and for determining a suitable route to direct backhaul traffic to/from the core network from/to the new mesh BS. Additionally, a connected mesh BS 1005 may use the NDSB to identify alternate parent BS choices, update the corresponding path metrics and/or identify strong interferers. The present disclosure provides embodiments on the use of radio resource measurements (RRM) and other information from the NDSB for routing, performing hand-over and mitigating interference among connected mesh BSs.

In a typical mesh network, each mesh BS may have multiple candidates for a parent BSs. One example is illustrated in FIG. 10, where mesh BS 1002 can access the core-network either by chosing gateway BS 1010 as parent or mesh BS 1005 as the parent. Such multiple connection possibilities, while providing diversity against channel blocking or node failure, may also increase the possibility of strong interference. In one embodiment, a procedure for using NDSBs is provided for identifying candidate parent BSs and the set of BSs causing strong interference, and the corresponding flow diagram is illustrated in FIG. 12.

FIG. 11 illustrates an example transmission timing structure 1100 for dedicated measurement gap for NDSB transmissions according to embodiments of the present disclosure. The embodiment of the transmission timing structure 1100 illustrated in FIG. 11 is for illustration only. FIG. 11 does not limit the scope of the present disclosure to any particular implementation. As illustrated in FIG. 11, the dedicated measurement gap for NDSB transmissions may be used in base stations (e.g., 101-103 as illustrated in FIG. 1) to exchange NDSB transmissions and make measurements for candidate parent and interferer discovery.

Figure 12:
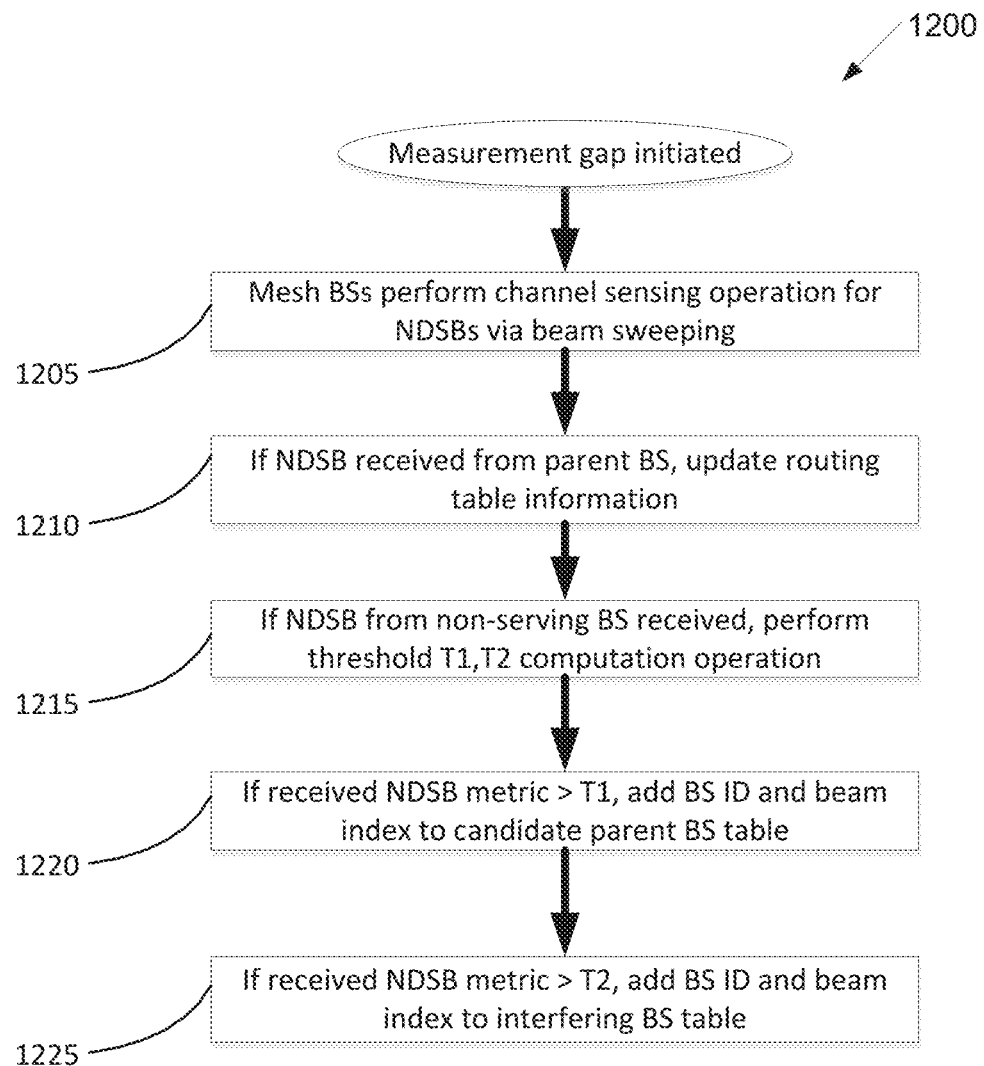
FIG. 12 illustrates a flowchart of a method for candidate BS and interfering BS identification according to embodiments of the present disclosure.

FIG. 12 illustrates a flowchart of a method 1200 for candidate BS and interfering BS identification according to embodiments of the present disclosure. For example, the method 1200 may be implemented by a base station (e.g., 101-103 as illustrated in FIG. 1). The embodiment of the method 1200 illustrated in FIG. 12 is for illustration only. FIG. 12 does not limit the scope of the present disclosure to any particular implementation.

In various embodiments, a mesh BS may continuously listen for NDSBs transmitted by other BSs, when the mesh BS is not transmitting. In another embodiment a mesh BS may listen for NDSBs transmitted by other BSs during a periodic measurement gap dedicated for NDSB transmission/reception, as illustrated in FIG. 11. This NDSB reception operation is illustrated as step 1205 in FIG. 12. In one embodiment, the NDSBs may be transmitted/received by a mesh BS via beam sweeping. A listen mode mesh BS may utilize the PSS/SSS or the RS(s) in the NDSB for performing RRM measurements to the transmitting BS, for each transmit/receive beam index pair. Such RRM may include the measurement and/or computations of reference signal received power (RSRP), received signal strength indicator (RSSI), and/or reference signal received quality (RSRQ), etc. The listening mesh BS may also utilize additional information in the NDSB MIB/SIB to compute path metrics. Thus, the NDSB received from the current parent BS can be utilized for updating the current serving path information in the routing table at a mesh BS. This procedure is illustrated as step 1210 in FIG. 12.

Figure 13:
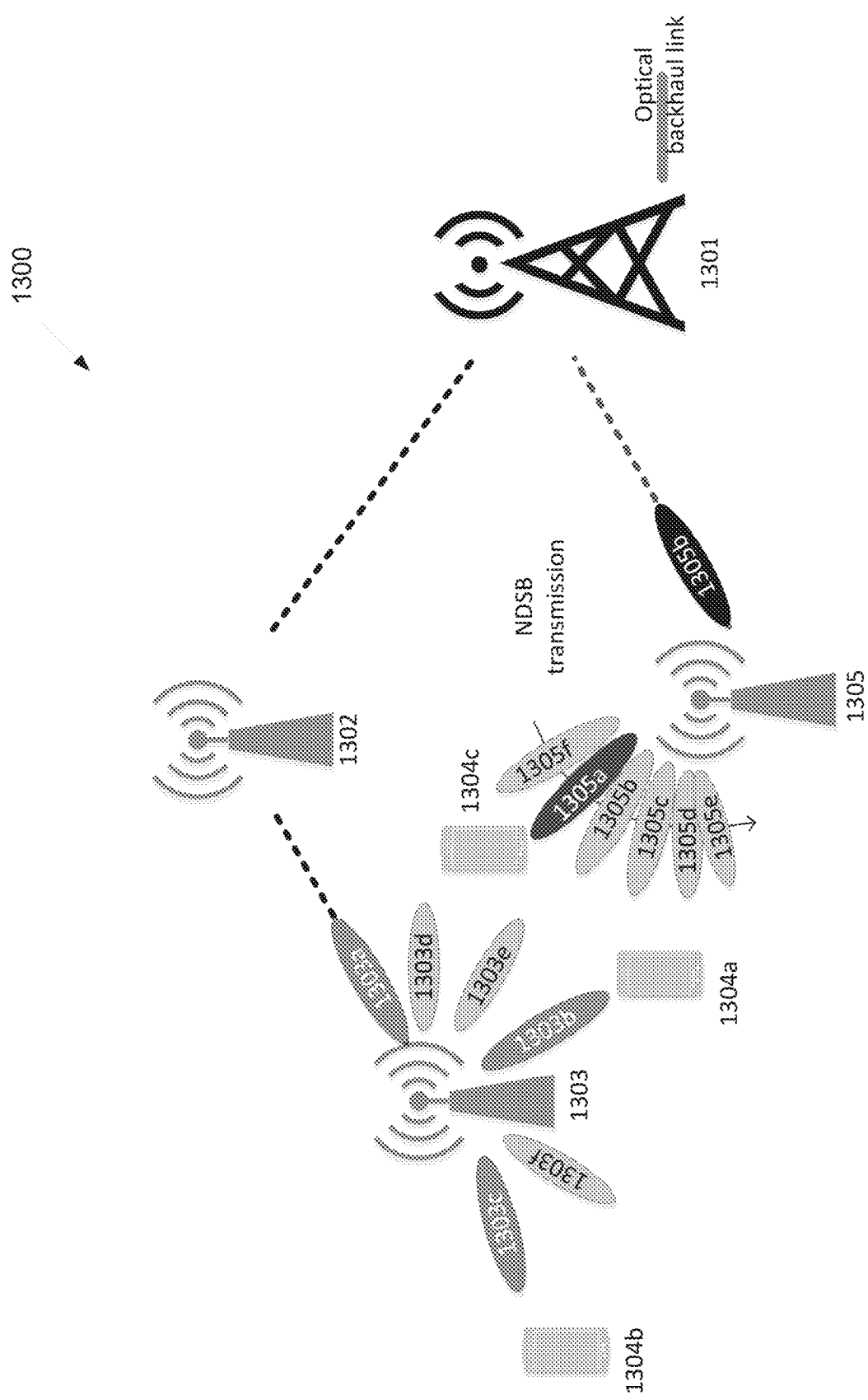
FIG. 13 illustrates an example NDSB transmission in a wireless backhaul mesh network to identify parent/interference candidates according to embodiments of the present disclosure.

FIG. 13 illustrates an example NDSB transmission in a wireless backhaul mesh network 1300 to identify parent/interference candidates according to embodiments of the present disclosure. For example, the wireless backhaul mesh network 1300 may be an implementation of the wireless backhaul mesh network 900 in FIG. 9. The embodiment of the wireless backhaul mesh network 1300 illustrated in FIG. 13 is for illustration only. FIG. 13 does not limit the scope of the present disclosure to any particular implementation.

As illustrated in FIG. 13, a base station (e.g., 101-103 as illustrated in FIG. 1) may be implemented as a mesh BS 1302, 1303, 1305, and/or a gateway BS 1301. In these embodiments, each mesh BS maintains two thresholds T1 and T2. The threshold T1 can be used to identify candidate parent BSs while the threshold T2 can be used to determine possible interfering BSs. As illustrated in FIG. 13, an NDSB transmitting BS 1305 can be considered a candidate parent BS for a mesh BS 1303 if the path metric (e.g., NDSB RSRP) for any transmit and receive beam pair, e.g. (1305a, 1303e), exceeds the threshold T1.

In another embodiment, an NDSB transmitting BS 1305 is considered a candidate parent BS at BS 1303 if the path metric (for path to a gateway BS) associated with any beam pair (e.g., 1305a, 1303e) is greater than the threshold T1.

In one embodiment, the threshold T1 is predetermined while, in another embodiment, the threshold T1 is computed at each mesh BS based on a certain metric, e.g., RSRP or some other path metric for the current parent BS. In another embodiment, the threshold T1 is time varying, for example, depending on when the parent BS was last updated. In another embodiment, the path metric or the threshold T1 may be a function of the number of candidate interferers and corresponding interference levels for the receive beam at 1303e.

In another embodiment, the threshold T1 can be determined at each BS based on the BS's own transmission pattern and any transmission pattern information included in the NDSB from the candidate parent BS. This transmission pattern is a BS-specific set of rules that each BS may obey during the data transmission phase to, for example, meet the half duplexing constraints between transmission and reception.

As an illustration, one transmission pattern may correspond to transmitting on odd slots and receiving on even slots, in the case where data transmission phase is divided into slots (e.g., as illustrated in FIG. 11). Each BS may correspondingly maintain a candidate parent BS table, containing one or more of: the BS IDs, beam pairs, a transmission pattern of candidate BSs and some other path metrics. The computation of the threshold T1 and corresponding update of the candidate parent BS table is illustrated as steps 1215 and 1220 in FIG. 12.

Similarly, a transmit BS beam 1305*a* can be considered a potential source of strong interference at a receive mesh BS beam 1303*e* if the corresponding path metric (e.g., NDSB RSRP) exceeds a threshold T2. Similarly, a transmit BS beam 1305*d* can be considered a strong source of interference to a UE 1304*a* if the path metric (e.g., NDSB RSRP) received on beam 1303*b* (access link serving the UE) is greater than a threshold T2.

In one embodiment, the current BS may set the threshold T2 to a constant value while, in another embodiment, the current BS may set T2 adaptively, which is either determined among pre-configured values or set to a value which may not be pre-defined, depending on situations. The current BS may set the threshold T2 to be common for all BSs, to be B S-specific, that is, separately configured for each BS, to be BS receive beam-specific, or to be determined based on the BS receive beam and the transmitted NDSB information.

In one example of beam specific threshold, a threshold T2 can be computed for each receive beam at a mesh BS depending on the stored RSRP values to BSs/UEs to be served on that receive beam. In FIG. 13, this may correspond to setting the T2 to a finite value for beams 1303*a-c*, while setting the T2 to infinity for beams 1303*d-f* which are unused by the mesh BS 1303 for transmission/reception.

In one example of receive beam and NDSB specific threshold, each BS 1305 may determine a beam priority level for different transmit/receive beams and include this information in the NDSB MIB/SIB. For example, the assigned beam priority may be higher for a fronthaul/backhaul beam 1305*b* than for an access beam 1305*a* and can be higher for a beam serving many UEs. A receiving BS 1303, may determine the threshold T2 for a receive beam using a receive beam priority level of the receiving BS 1303, and the priority level of the received NDSB. In another example of the NDSB specific threshold, the threshold T2 at a first BS for an NDSB from a second BS can be dependent on the transmission pattern overlap between the two BSs.

In one embodiment, a transmit beam 1305*b* can be considered a source of strong interference at a receive mesh BS beam 1303*d*, if the NDSBs from any of the adjacent transmit beam indices 1305*c*, 1305*a* are above threshold T2 for any of the adjacent receive beam indices 1303*e*, 1303*a*. The number of such adjacent beams to consider can be predetermined or determined based on the current BS height, transmit power, and/or cell radius etc. The adjacent beam indices can also be determined based on UE location estimates or feedback from UEs.

Each BS may correspondingly maintain an interfering BS table, containing one or more of the BS IDs, transmission patterns, transmit/receive beam pairs, priority levels and/or interference levels. The computation of threshold T2 and corresponding update of the interfering BS table is represented as steps 1215 and 1225 in FIG. 12.

In another embodiment, the BS may maintain a single table of NDSB sources (instead of separate parent candidate/interferer tables), whose RSRP or link metric is above a certain threshold. The unified table may serve as either candidates for parent BSs or as sources of strong interference. In one embodiment, these tables can have variable size while in another embodiment these tables have a fixed size, i.e., can save at most K entries.

In one embodiment, upon decoding the NDSBs, a BS may transmit a special packet to the BSs in an interference table called interference reply (IREP) packet. The IREP packet may contain information on the transmit beam causing the interference, and the priority order of the receive beam. Such information may be useful to obtain local connectivity information, for example, in the case where the channel is non-reciprocal. Additionally in one embodiment, several of the NDSB IEs mentioned in the previous section, may actually be transmitted within the IREP packets instead of in the NDSBs.

One or more of the candidate parent BSs table and interfering BS table can be transmitted by a mesh BS to a central processor via an existing path in the routing table. Such a central processor can be, for example, a gateway BS or a core network entity such as the mobility management entity (MME). In another embodiment, the information in the tables can be compressed before the information is sent to the central processor (e.g., core network 910 or gateway BS 902).

Figure 14A:
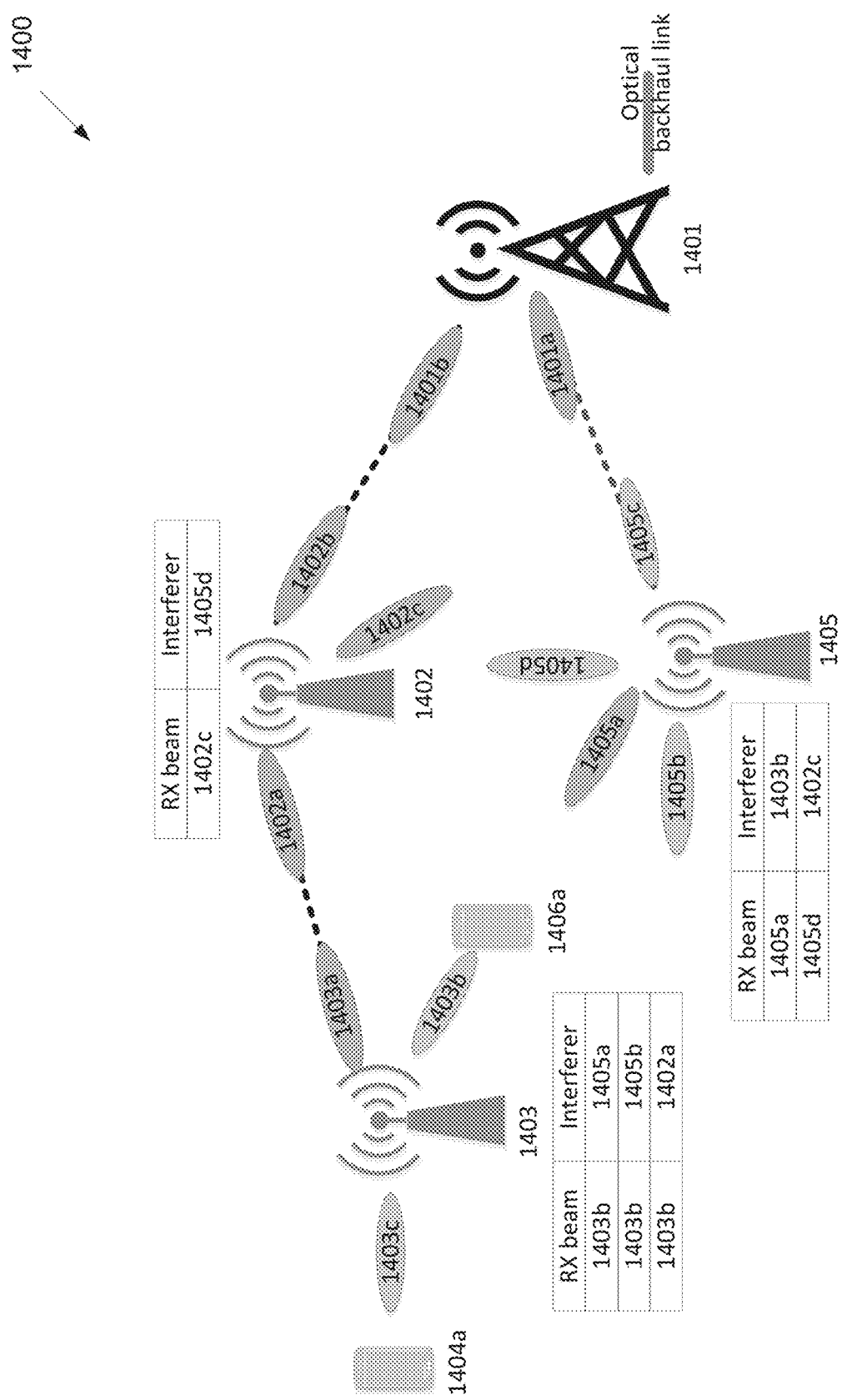
FIG. 14A illustrates an example interference table corresponding graph and graph based resource reallocation in a wireless backhaul mesh network according to embodiments of the present disclosure.

FIG. 14A illustrates an example interference table corresponding graph and graph based resource reallocation in a wireless backhaul mesh network 1400 according to embodiments of the present disclosure. For example, the wireless backhaul mesh network 1400 may be an example of one implementation of the wireless backhaul mesh network 900 in FIG. 9. The embodiment of the wireless backhaul mesh network 1400 illustrated in FIG. 14A is for illustration only. FIG. 14A does not limit the scope of the present disclosure to any particular implementation.

Figure 14B:
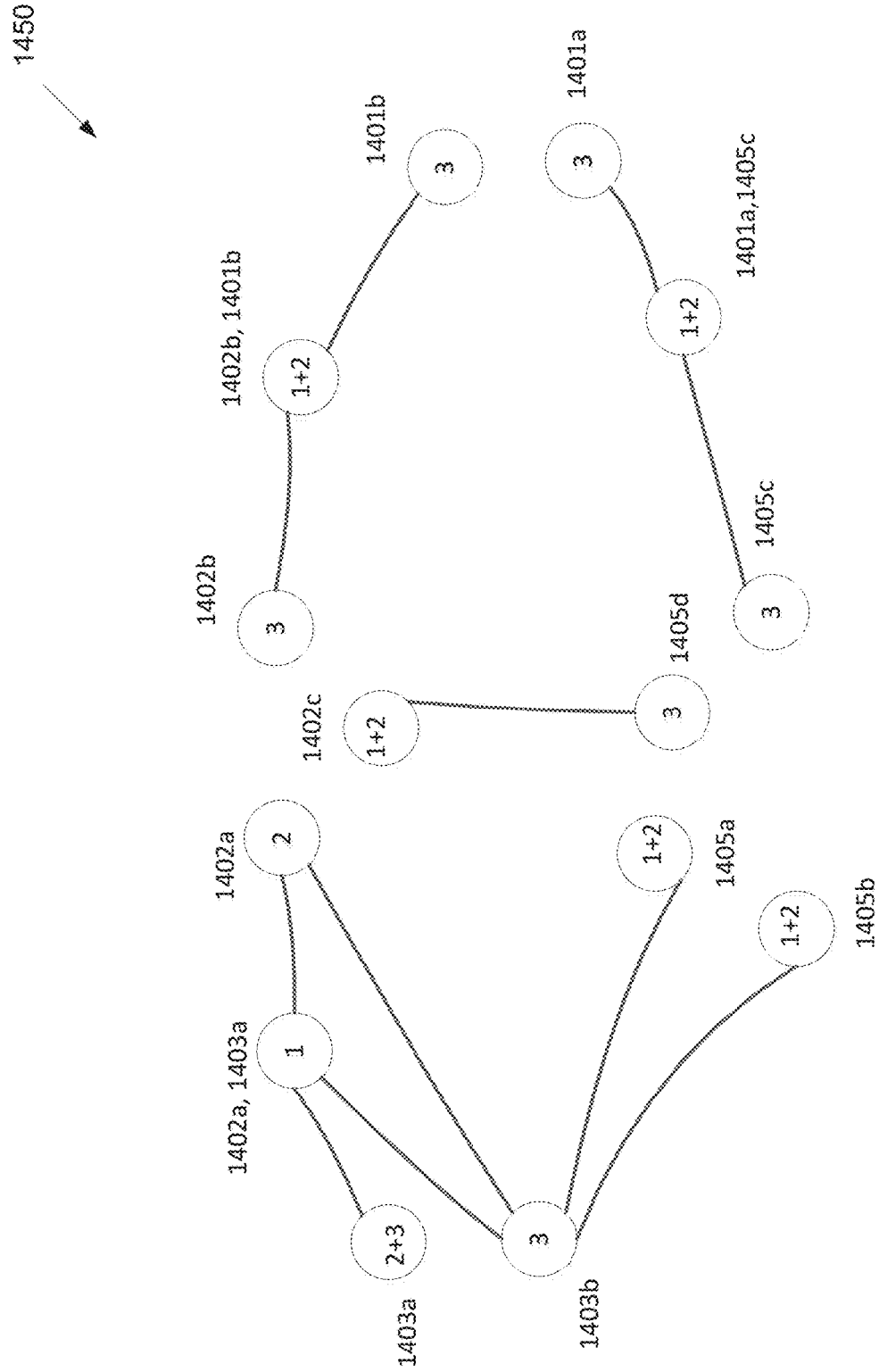
FIG. 14B illustrates an example of a conflict graph for transmit and receive beam pairs resource reallocation according to embodiments of the present disclosure.

FIG. 14B illustrates an example of a conflict graph 1450 for transmit and receive beam pairs resource reallocation according to embodiments of the present disclosure. For example, conflict graph 1450 may be an example of resource allocation based on the interference tables illustrated in FIG. 14A. The embodiment of conflict graph 1450 illustrated in FIG. 14B is for illustration only. FIG. 14B does not limit the scope of the present disclosure to any particular implementation.

Figure 15:
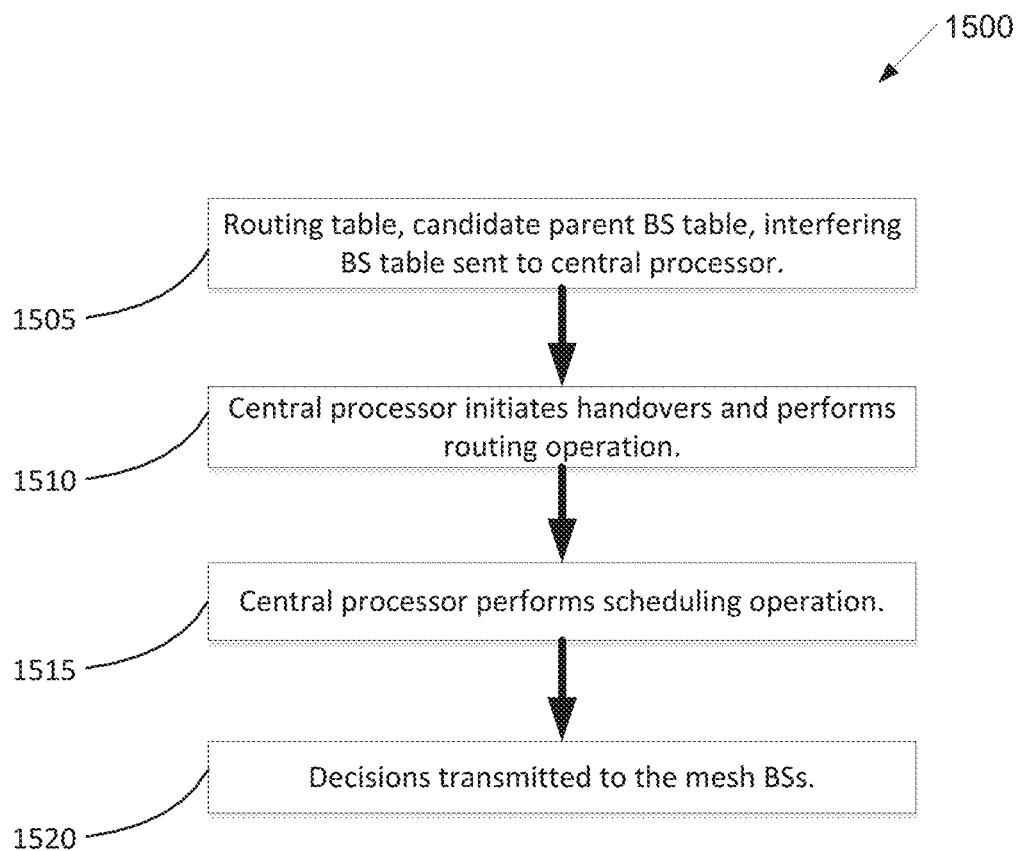
FIG. 15 illustrates a flowchart of a method for centralized routing, handover, and scheduling according to embodiments of the present disclosure.

FIG. 15 illustrates a flowchart of a method 1500 for centralized routing, handover, and scheduling according to embodiments of the present disclosure. For example, the method 1500 may be performed by a central processor or central network entity (e.g., core network 910 or gateway BS 902) and is described, by way of example, in connection with the interference tables illustrated in FIG. 14A and conflict graph 1450 illustrated in FIG. 14B. The embodiment of the method 1500 illustrated in FIG. 15 is for illustration only. FIG. 15 does not limit the scope of the present disclosure to any particular implementation.

In one example, a mesh BS may only report BS IDs and not the beam indices to the central processor. In one embodiment the central processor can also append additional entries to the tables. For example, for each receive-transmit beam pair in the interference table (e.g. 1305*a*, 1303*e* as illustrated in FIG. 13), the central processor can also add other adjacent transmit-receive beam pairs (1303*d*, 1305*f*), (1303*d*, 1305*a*) and (1303*b*, 1305*f*) to the table. This procedure of transmission of the tables to a central processor, with possible additional appending of entries, is illustrated as step 1505 in FIG. 15.

The tables can be utilized at the central processor to maintain network connectivity information and perform routing, hand-overs and scheduling decisions in a centralized manner. The flow diagram of the corresponding operations are illustrated in FIG. 15. For example, the update of path costs for the traffic from gateway to each mesh BS can be made in the routing table using the current parent BS link costs from the candidate parent BSs table. Similarly, the table of candidate parent BSs can also be utilized to initiate handover of a mesh BS upon radio link failure or discovery of a better path.

In one embodiment, the handover is initiated if the path cost for the candidate parent BS is larger than for the current parent BS by an amount $\Delta$ (where $\Delta \geq 0$). The value of $\Delta$ can be fixed, or adapted based on the time elapsed since the last parent BS change. The procedure for handover and routing update is represented as step 1510 in FIG. 15.

Similarly, the list of interfering beam pairs from all the mesh BSs, as well as the current parent-child BS beam pairs from the routing table can be utilized at the central processor for resource allocation and interference management. This can be accomplished, in one embodiment, by generating a conflict graph as illustrated in FIG. 14B. For example, in one embodiment, all the beams at any BS that feature in any of the interference tables (e.g., 1405a, 1405b, 1405d for a BS 1405) or belong to an active parent child mesh link (e.g., 1405c for the BS 1405) are represented as separate nodes in the graph, called beam nodes and may be denoted as 1405a, 1405b, 1405c, and 1405d, etc.

Additionally, each parent-child beam pair from the routing table between mesh BSs, e.g., (1403a, 1402a), is also represented as a separate node in the graph, called a parent-child node and denoted as 1403a, 1402a. An edge exists between two beam nodes (e.g., 1403b and 1405b), if the corresponding beam pair (e.g., 1403b, 1405b) belongs to the interference table at any one of the two BSs. Similarly, an edge exists between a parent-child node (e.g., 1403a and 1402a) and a beam node 1405a if any of the pairs (e.g., 1403a, 1405a or 1402a, 1405a) are in an interference table.

An edge also exists from a parent-child node (e.g., 1403a, 1402a) to a beam node (e.g., 1403a), when the beam corresponding to the beam node (e.g., 1403a) is same as one of the beams in the parent-child beam pair (e.g., 1403a, 1402a). An edge exists between two parent-child nodes if any of the beams are identical or if any of the four beam pairs (formed using one beam from first parent-child node and another beam from second parent-child node) feature in an interference table.

In one example, the scheduling problem for the different beams can then be approximated as the problem of coloring the graph, where the different nodes sharing an edge are to be assigned different colors (or resources). The chromatic number of the graph may determine the total number of such orthogonal time/frequency/code resources required to satisfy all links. An additional step involves considering each node of the graph sequentially, and adding to each node any of the remaining colors that do not cause a violation of graph coloring.

One such example is illustrated in FIGS. 14A and 14B, where the colors are represented as numbers within the nodes. The total time-frequency resources can be equally split among all the graph colors, or the splitting can be determined based on the priority levels of the beams scheduled within each color. The resources assigned are then communicated from the central processor, through the existing routing paths to each mesh BS. Note that each active backhaul mesh link is represented by a parent-child node and thus is assigned a specific amount of resource (corresponding to the assigned color).

For the beams corresponding to the beam nodes, the assigned resources can be utilized to serve the access links to UEs. For beams not represented in the graph, all the resources can be used. This procedure for resource allocation and scheduling is represented as step 1515 with scheduling decisions transmitted to the mesh BSs represented by step 1520.

In another embodiment, two separate conflict graphs are generated, one graph with only the parent-child nodes and one graph with beam nodes. The mechanism for generating the edges is similar to the previous embodiment. Graph coloring is performed on both the graphs separately with separate colors. Next the complete graph with both parent-child nodes and beam nodes is constructed as in the previous embodiment. Each node is then considered sequentially and additional colors are assigned to each node, that do not violate any overall graph coloring constraints. The last step then just involves division of the resources to the different colors. In one example, all the colors associated with the beam graph can be assigned one amount of time/frequency/code resources, while colors associated with the parent-child graph can be assigned another amount of time/frequency/code resources.

In various embodiments, the current parent BS information, candidate parent BS table and/or interfering BS table may not be transmitted to a central location. The resource allocation and routing may be performed in a decentralized manner by each mesh BS using one or more of these tables.

Figure 16A:
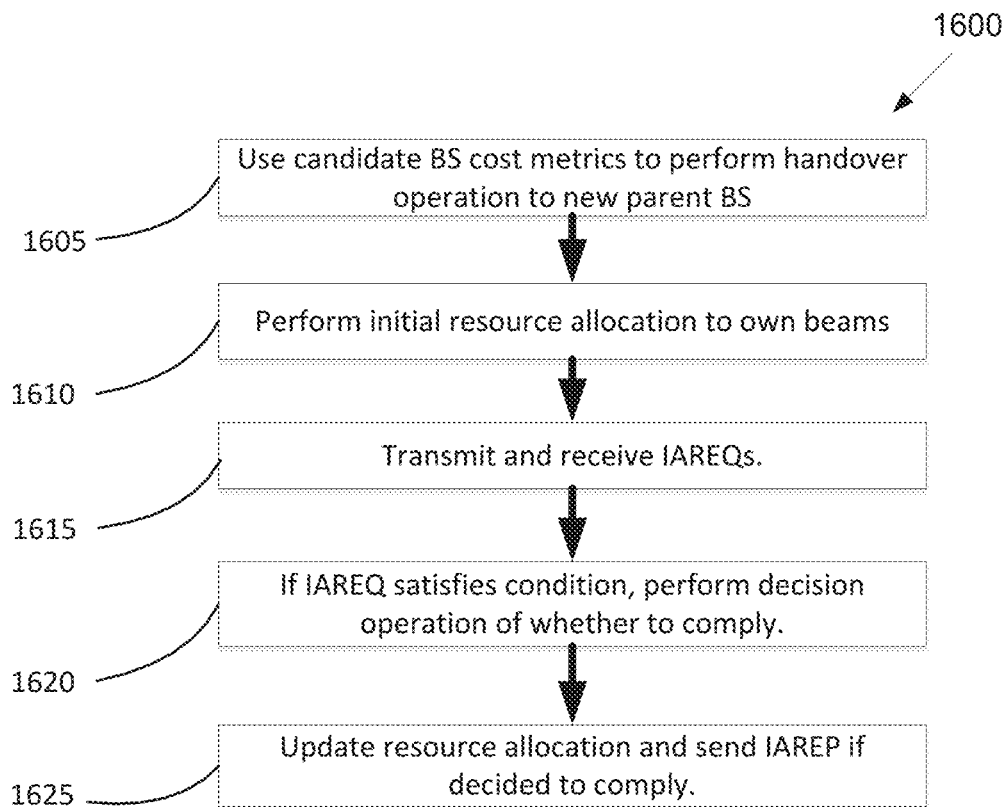
FIG. 16A illustrates a flowchart of a method for decentralized routing, handover, and scheduling with resources picked independently according to embodiments of the present disclosure.

FIG. 16A illustrates a flowchart of a method 1600 for decentralized routing, handover, and scheduling with resources picked independently according to embodiments of the present disclosure. For example, the method 1600 may be performed by a mesh BS (e.g., BS 101-103 as illustrated in FIG. 1). The embodiment of the method 1600 illustrated in FIG. 16A is for illustration only. FIG. 16A does not limit the scope of the present disclosure to any particular implementation.

Figure 16B:
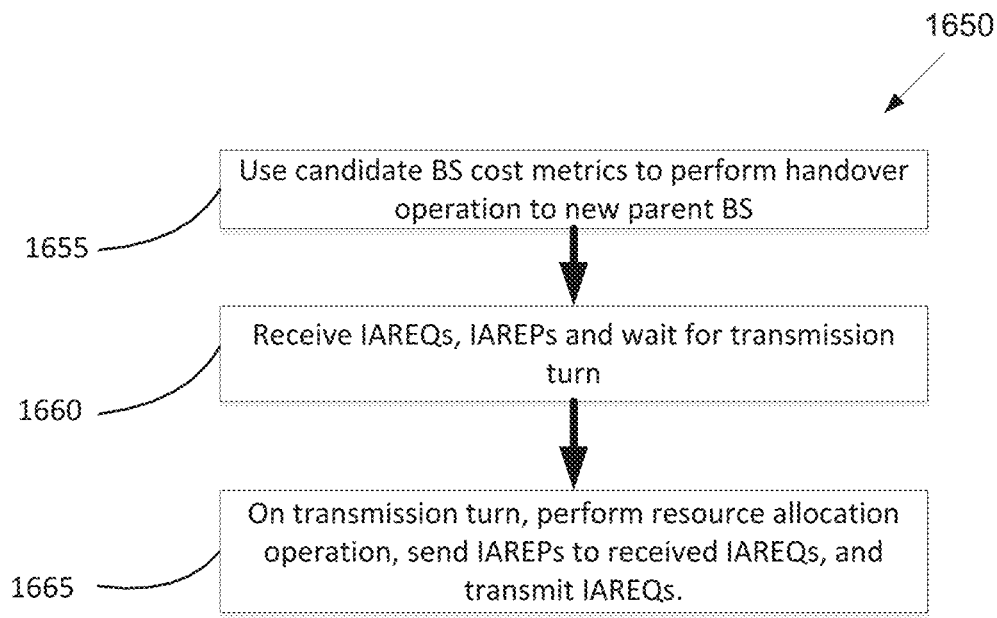
FIG. 16B illustrates a flowchart of a method for decentralized routing, handover, and scheduling with resources picked sequentially according to embodiments of the present disclosure.

FIG. 16B illustrates a flowchart of a method 1650 for decentralized routing, handover, and scheduling with resources picked sequentially according to embodiments of the present disclosure. For example, the method 1600 may be performed by a mesh BS (e.g., BS 101-103 as illustrated in FIG. 1). The embodiment of the method 1650 illustrated in FIG. 16B is for illustration only. FIG. 16B does not limit the scope of the present disclosure to any particular implementation.

The flow diagram of the corresponding operations are illustrated in FIGS. 16A and 16B. In one embodiment, a mesh BS can update a routing table using the path metric and/or RSSI information contained within the NDSB from the current parent BS and the number of interferers to this parent-child link from the interference table. In one embodiment, a mesh BS can also initiate a handover to another candidate parent BS if the path metric and/or RSSI information from the candidate parent BS table is better than from current parent BS by an amount $\Delta$ (where $\Delta \geq 0$). The value of $\Delta$ can be fixed, or adapted based on the time elapsed since the last parent BS change. These operations are illustrated as steps 1605 and step 1655 in FIGS. 16A and 16B, respectively.

Similarly the interfering BS table can be used to mitigate interference in a decentralized manner as discussed below.

In one embodiment of the resource allocation, the transmission on beams that are not in the interference table can be assigned full available resources (that comply with the beam transmission pattern if any), while transmission on the beams which are within a BS's own interference table can be performed opportunistically based on channel sensing, such as in carrier sense multiple access, or slotted ALOHA, etc. or can be performed using a large coding gain.

In another embodiment, a mesh BS may perform an initial resource allocation to the mesh BS's beams without knowledge of resource allocation at other BSs. The flow diagram of this embodiment is provided in FIG. 16A, where the initial resource allocation is represented as step 1610. After resource allocation for each of beams, a mesh BS may transmit a packet to request interference avoidance to neighboring mesh BSs within an interference table. Such packet may be referred to as the interference avoidance request (IAREQ) in the present disclosure, and is illustrated as step 1615 in FIG. 16A. In one embodiment, the IAREQ may be transmitted for only some beams that serve links above a threshold priority level.

In one embodiment, the IAREQ may be transmitted in the random access channel (RACH). These IAREQs may use the same resources as the UE RACH or there may be a separate reserved resource. This IAREQ may include the transmitting BS ID, one or more receive beam indices with beam priority values, one or more transmit beam indices, transmission resources to avoid, and/or suggested power levels, etc. Such an IAREQ can be used to inform a potential interfering BS to avoid transmission and/or reduce power level for specific beams, and/or to perform joint resource allocation to the interfering beam pairs.

As illustrated in FIG. 14A, an IAREQ can be sent from a BS 1403 to a BS 1405 requesting avoidance of transmission on beams (e.g., 1405a) and reduction of transmission power on 1405b. In another embodiment, the IAREQ can be a broadcast message containing the list of potential interfering BS s and the relevant information aforementioned. Correspondingly, a BS may transmit an interference avoidance response (IAREP) for each IAREQ the BS receives, where the BS informs the source of the IAREQ if the BS may honor the IAREQ.

The IAREP transmission is illustrated as step 1625 in FIG. 16A. The decision to honor IAREQ can be made based on the information contained in the IAREQ, own network load, own transmission pattern, the beam priority level for own beams etc and is represented as step 1620 in FIG. 16A.

In one example, for the IAREQ from a BS 1403 (for beam 1403b), an IAREP can be transmitted by a BS 1405 if either (a) the resource assignment to beam (e.g., 1405a) complies with the IAREQ or (ii) BS 1405 is willing to forgo the conflicting fraction of assigned resources to beam (e.g., 1405a). To avoid ping-ponging of resource allocation, a BS receiving an IAREQ may ignore it if two conditions are satisfied: (a) the BS has already transmitted an IAREQ for the same beam pair (b) the receiving BS's ID is larger than the transmitting BS's ID. The beams for which no IAREQ was sent can utilize all the resource blocks that comply with transmission pattern (if any). The transmission on beams for which an IAREQ was received but an IAREP was not transmitted or an IAREQ was transmitted but an IAREP was not received, can be performed opportunistically based on the channel sensing, such as in carrier sense multiple access, slotted ALOHA, etc., or in a protected mode with a low throughput and large coding gain.

In one embodiment, for example, in cases where full duplexing between transmission and reception is not supported, the IAREQ packets may also be transmitted across existing mesh links (e.g., 1403a, 1402a). This IAREQ can be used by parent (child) BS to inform a child (parent) BS about an intention to transmit downlink (uplink) signals on a set of resources. The child (parent) BS accordingly can choose an orthogonal set of resources for transmitting the uplink (downlink) signals. In another embodiment, the resources for both uplink and downlink may be assigned by the parent BS.

In another embodiment, the resources may be sequentially picked by the BSs in the network. The flow diagram for this embodiment is illustrated in FIG. 16B. In this embodiment, a first mesh BS receives any IAREQs and IAREPs (e.g., to prior IAREQs) in step 1660. The first mesh BS determines a feasible resource allocation for beams based on local network knowledge, and transmits an IAREQ packet to all BSs within an interference list. The resources are then sequentially picked at each mesh BS based on a sequence order. The resource allocation at a BS tries to comply with the previous IAREQ packets received from other BSs.

If the allocation is compatible to a previously received IAREQ, an IAREP is transmitted to the source BS of that IAREQ packet. After allocating resources to all beams, a BS transmits IAREQ message to all BSs in an interference table and/or candidate parent BS table with a higher sequence number. This operation is represented as step 1665 in FIG. 16B. The transmission on the common resources at two beams for which IAREQs were exchanged but an IAREP was not transmitted/received, can be performed opportunistically based on the channel sensing, such as in carrier sense multiple access, slotted ALOHA, etc., or in a protected mode with a low throughput and large coding gain.

The sequence of reserving resources and transmitting the IAREQ/IAREPs can be decided based on, for example, the BS IDs carried within the NDSB. In this example, a mesh BS transmits the IAREQ/IAREP packet only after the mesh BS has received the IAREQ packets from all BSs with a lower BS ID within an interference table, or if a certain watchdog timer has been exhausted. The duration of the watchdog timer can be fixed or different for each BS determined, for example, based on a BS ID.

In various embodiments, if the interference between BSs cannot be resolved (e.g., IAREPs indicating non-compliance) additional procedures for interference handling are provided. In one example, for a beam that is interfered and the UEs and/or child BSs scheduled using the beam, the BS finds and switches to the best alternative beam that is not interfered. To perform beam switching, each BS may identify and maintain a list of N best beam pairs for the backhaul links and/or access links. In another example, if the BS has multi-path routing enabled, the BS may to steer the traffic to another parent BS, if the beam towards the other parent BS is not interfered.

Figure 17:
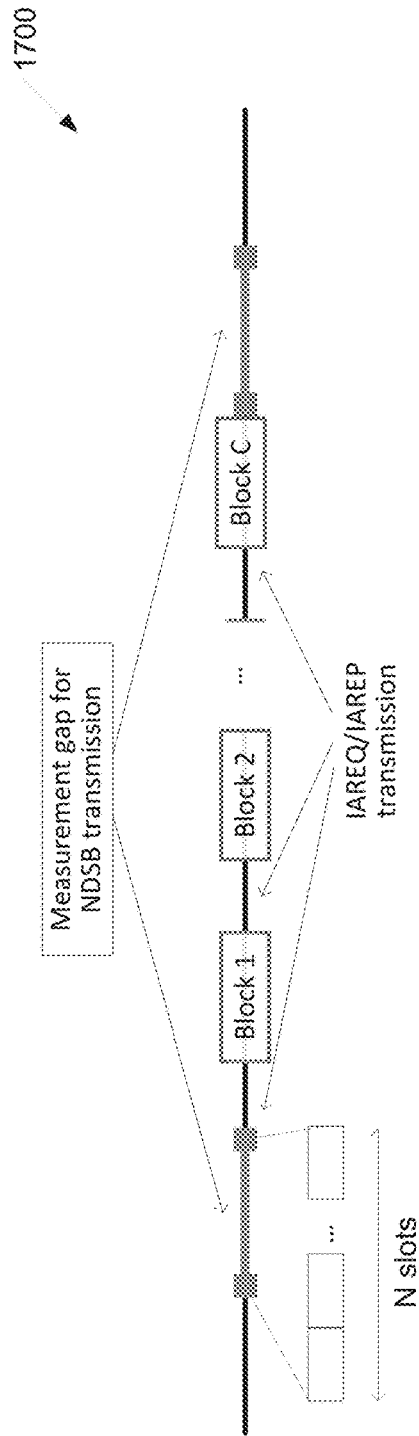
FIG. 17 illustrates an example transmission timing structure including dedicated IAREQ-IAREP slots for a decentralized approach according to embodiments of the present disclosure.

FIG. 17 illustrates an example transmission timing structure 1700 including dedicated IAREQ-IAREP slots for a decentralized approach according to embodiments of the present disclosure. The embodiment of the transmission timing structure 1700 illustrated in FIG. 17 is for illustration only. FIG. 17 does not limit the scope of the present disclosure to any particular implementation.

As illustrated in FIG. 17, the dedicated IAREQ-IAREP slots for decentralized approach for routing, scheduling, and interference handling are between blocks for NDSB transmission. In various embodiments, while the interference tables are built based on the measurement gap for NDSB transmission/reception, IAREQ and/or IAREP exchange can happen at a different time scale. As an example, as illustrated in FIG. 17, the data transmission phase can be divided into C blocks with each block being preceded by a reserved duration for transmitting and receiving IAREQs and IAREPs.

Figure 18:
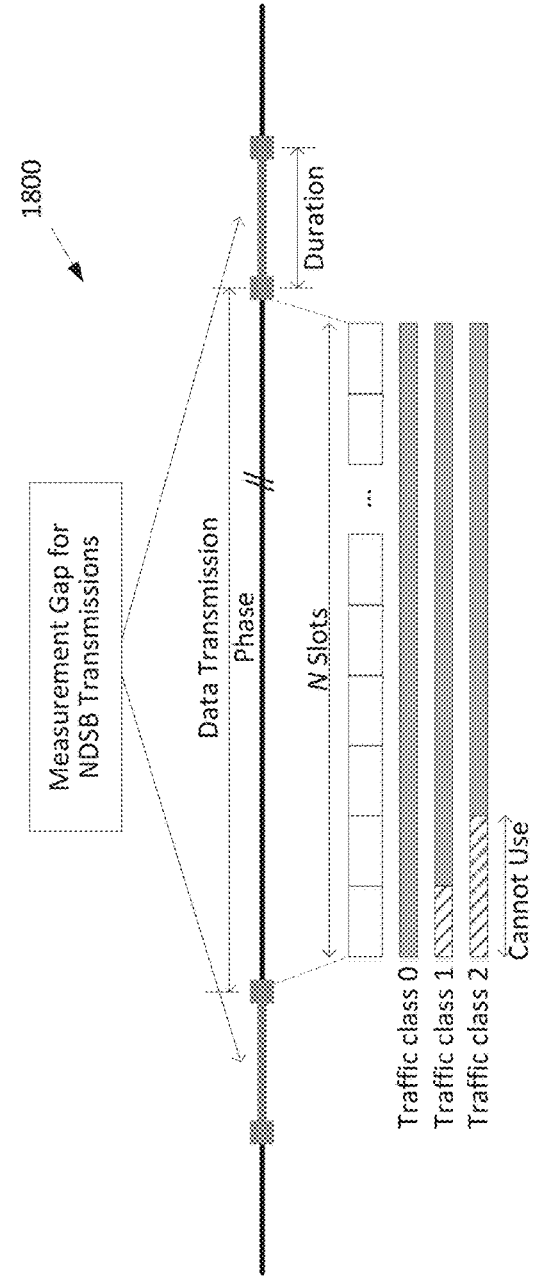
FIG. 18 illustrates an example frame structure for random backoff based on traffic class according to embodiments of the present disclosure.

FIG. 18 illustrates an example transmission timing structure 1800 for random backoff based on traffic class to address the case of unresolved interference between BSs, according to embodiments of the present disclosure. The embodiment of the transmission timing structure 1800 illustrated in FIG. 18 is for illustration only. FIG. 18 does not limit the scope of the present disclosure to any particular implementation.

In various embodiments, additional procedures for interference handling are provided. As a further example, if the interference between BSs cannot be resolved, one of the BSs performs random backoff and channel sensing prior to transmission. The random backoff parameters, (e.g., defer duration and min/max contention window sizes) can be based on link priority (e.g., backhaul vs. access link) and/or data quality of service (QoS) class. As illustrated in FIG. 18, different traffic classes (e.g., lower QoS classes) have longer backoff durations in number of slots during the data transmission phase.

Figure 19:
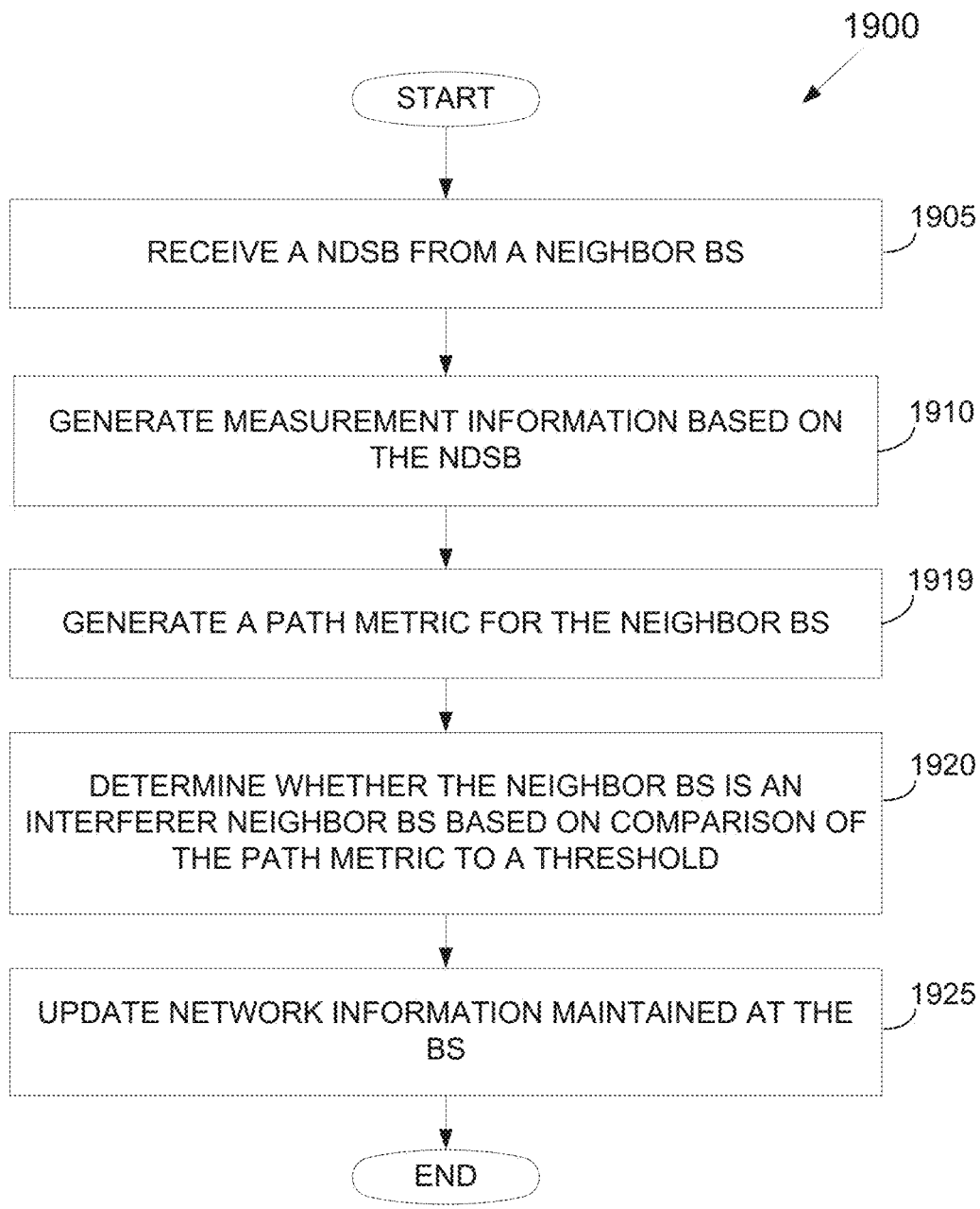
FIG. 19 illustrates a flowchart of a method for maintaining network information according to embodiments of the present disclosure.

FIG. 19 illustrates a flowchart of a method 1900 for maintaining network information according to embodiments of the present disclosure, may be performed by a base station (e.g. 101-103 as illustrated in FIG. 1). The embodiment of the method 1900 illustrated in FIG. 19 is for illustration only. FIG. 19 does not limit the scope of the present disclosure to any particular implementation.

The method 1900 begins with the BS receiving a NDSB from a neighbor BS in the wireless communication network (step 1905). For example, in step 1905, the wireless communication network may be a mesh backhaul network or may be a cellular network with a wired/fiber backhaul.

The BS then generates measurement information based on the NDSB (step 1910). For example, in step 1910, the BS may use reference signals in the NDSB to determine RSRP or other channel conditions. Additionally, such measurements may be performed for transmit and receive beam pairs between the BS and the neighbor BS by performing, for example, a beam sweeping procedure as part of or separately from NDSB transmission and reception.

The BS then generates a path metric for the neighbor BS (step 1915). For example, in step 1915, the BS generates the path metric based on the generated measurement information. Path metrics may be generated for each of the transmit and receive beam pairs using the measurements and information included in the NDSB (e.g., mesh capability information, gateway BS indication, random access resource, routing information, hardware capability information, beam priority information, BS transmission pattern information, etc.).

The BS then determines whether the neighbor BS is an interferer neighbor BS based on comparison of the path metric to a threshold (step 1920). For example, in step 1920, the determination of whether the neighbor BS is an interferer neighbor BS may be based on the path metrics for the transmit and receive beam pairs and the identification of interferer may be on a per beam pair level. The threshold for interferer may be adaptive or fixed.

In addition to interferer identification and particularly for mesh backhaul embodiments, the NDSB process may further include the use of NDSB transmission and reception to identify candidate parent BSs. For example, the BS may receive a NDSB from another neighbor BS in the wireless communication network, generate measurement information based on the NDSB, generate a path metric for the neighbor BS based on the generated measurement information, and identify the neighbor BS as a candidate parent BS based on comparison of the path metric to a threshold. The threshold for the candidate parent may be adaptive or fixed. The identification of the candidate parent BS may also be based on transmit and receive beam pairs between the BS and the neighbor BS by performing, for example, a beam sweeping procedure as part of or separately from NDSB transmission and reception. The identification of the neighbor BS as the candidate parent BS may be based on the path metrics for the transmit and receive beam pairs and the identification of candidate parent may be on a per beam pair level. Additionally, or alternatively, one BS may be identified as both an interferer and candidate parent. For example, the identifications can be made at the beam level such that for one or more beam pairs the BS is a candidate parent and for one or more other beam pairs the BS is an interferer.

Thereafter, BS updates network information maintained at the BS (step 1925). For example, in step 1925, the BS updates the network information to include the determination of the neighbor BS as the interferer neighbor BS and/or the candidate parent BS, for example, on a beam level. This network information may be maintained in one or more tables that include BS identifiers, identifiers for the transmit and receive beam pairs, and the path metrics for the transmit and receive beam pairs.

Additionally, the BS may transmit, to a central network entity, the one or more tables or updates to the one or more tables and, in embodiments for centralized scheduling, receive, from the central network entity, routing and scheduling information for data transmission and reception by the BS. The central network entity may determine the routing and scheduling information based on a conflict graph for the transmit and receive beam pairs for the interferer neighbor BSs to reduce BS neighbor interference in the wireless communication network, e.g., as discussed above with regard to FIGS. 14A-15.

In embodiments for decentralized scheduling, the BS may initiate handover to the candidate parent BS based on the path metric for the candidate parent BS exceeding the path metric for the current parent BS of the BS by a threshold amount. This threshold amount can be fixed or adaptive. The BS may also identify resources for the BS to use based on the beam identifiers for the beams of the interferer neighbor BSs by identifying resources to use on beams that are not included in the beams of the interferer neighbor BSs and identify additional resources to use via an opportunistic transmission or low code rate transmission on the beams that are included in the beam identifiers of the interferer neighbor BSs e.g., as discussed above with regard to FIGS. 16A-16B.

In various embodiments for decentralized scheduling, the BS may identify resources for the BS to use and transmit, to the interferer neighbor BSs in the list, (or broadcast) an IAREQ message including an interference avoidance request for the identified resources. The BS may then receive one or more IAREP messages indicating whether one or more of the interferer neighbor BSs, respectively, will comply with the interference avoidance request and may modify the resources used by the BS based thereon. In response to receipt of an IAREP message indicating non-compliance with the interference avoidance request, the BS may determine whether to use at least a portion of the identified resources via an opportunistic transmission or low code rate transmission. In another example, in response to receipt of an IAREP message indicating non-compliance with the interference avoidance request, the BS at least one of: switch a transmit and receive beam pair to an alternative beam transmit and receive pair with reduced interference; switch to another parent BS if available; transmit in a protected mode with a low coding rate; and perform random or deterministic backoff, depending on the link priority or data quality of service class, and channel sensing prior to transmission e.g., as discussed above with regard to FIGS. 16A-18.

The BS may also receive an IAREQ message from a neighboring BS including an interference avoidance request and determine whether the BS will comply with the interference avoidance request based on information in the received IAREQ message, a transmission pattern of the BS, and a beam priority level for beams of the BS. Based on this decision, the BS may then transmit, to the neighboring BSs, an IAREP message indicating whether the BS will comply with the interference avoidance request and may modify the resources used by the BS based thereon. e.g., as discussed above with regard to FIGS. 16A-18.

Although the present disclosure has been described with an exemplary embodiment, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined only by the claims.

What is claimed is:

1. A base station (BS) in a wireless communication network, the BS comprising:
   a transceiver configured to receive a neighbor discovery signal block (NDSB) from a neighbor BS in the wireless communication network; and
   a processor operably connected to the transceiver, the processor configured to:
      generate measurement information based on the NDSB;
      generate at least one path metric for the neighbor BS based on the generated measurement information;
      determine whether the neighbor BS is an interferer neighbor BS based on comparison of the at least one path metric to a first threshold and whether the neighbor BS is a candidate parent BS based on comparison of the at least one path metric to a second threshold; and
      update network information maintained at the BS based on the determination of whether the neighbor BS is the interferer neighbor BS.

2. The BS of claim 1, wherein:
   the generating of the measurement information comprises performing, by the processor, measurements for transmit and receive beam pairs between the BS and the neighbor BS based on reference signals included in the NDSB;
   the generating of the at least one path metric for the neighbor BS comprises generating, by the processor, path metrics for the transmit and receive beam pairs using the measurements and information included in the NDSB; and
   the determination of whether the neighbor BS is the interferer neighbor BS is based on the path metrics for the transmit and receive beam pairs.

3. The BS of claim 2, wherein the network information is maintained in one or more tables that include BS identifiers, identifiers for the transmit and receive beam pairs, and the path metrics for the transmit and receive beam pairs.

4. The BS of claim 3, wherein the transceiver is further configured to:
   transmit, to a central network entity, the one or more tables or updates to the one or more tables; and
   receive, from the central network entity, routing and scheduling information for data transmission and reception by the BS.

5. The BS of claim 4, wherein:
   the one or more tables include an interference table and a candidate parent table, and
   the routing and scheduling information is determined, based on a conflict graph for the transmit and receive beam pairs in the interference table and transmit and receive beam pairs in the candidate parent table, to reduce BS neighbor interference in the wireless communication network.

6. The BS of claim 1, wherein:
   the transceiver is further configured to receive a second NDSB from a second neighbor BS in the wireless communication network,
   the generating of the measurement comprises generating second measurement information based on the second NDSB;
   the generating of the at least one path metric comprises generating a second path metric for the second neighbor BS based on the generated second measurement information; and
   the processor is configured to:
      determine whether the second neighbor BS is the candidate parent BS based on comparison of the second path metric to the second threshold; and
      based on determining that the second neighbor BS is the candidate parent BS:
         determine a plurality of transmit and receive beam pairs for association with the second neighbor BS;
         update the network information maintained at the BS;
         compare the second path metric for the candidate parent BS to a path metric for a current parent BS of the BS; and
         initiate handover to the candidate parent BS based on the second path metric for the candidate parent BS exceeding the path metric for the current parent BS of the BS by a third threshold amount, and
   the third threshold amount is fixed or adaptive.

7. The BS of claim 1, wherein:
   the network information maintained at the BS includes beam identifiers for beams of interferer neighbor BSs in an interference table, and
   the processor is configured to identify resources for the BS to use based on the beam identifiers for the beams of the interferer neighbor BSs by:
      determining resources to use on beams that do not have interferer neighbor BSs in the interference table, and
      determining resources to use via an opportunistic transmission or low code rate transmission on the beams that have interferer neighbor BSs in the interference table.

8. The BS of claim 1, wherein:
   the network information maintained at the BS includes a list of interferer neighbor BSs,
   the processor is configured to determine resources for the BS to use,
   the transceiver is configured to:

transmit, to the interferer neighbor BSs in the list, an interference avoidance request (IAREQ) message including a first interference avoidance request for the determined resources;

receive an IAREQ message from a neighboring BS including a second interference avoidance request;

transmit, to the neighboring BSs, an interference avoidance response (IAREP) message indicating whether the BS will comply with the second interference avoidance request; and receive one or more IAREP messages indicating whether one or more of the interferer neighbor BSs, respectively, will comply with the first interference avoidance request, and the processor further configured to:

determine whether the BS will comply with the second interference avoidance request based on information in the received IAREQ message, a transmission pattern of the BS, and a beam priority level for beams of the BS; and modify the resources used by the BS based on the determination of whether to comply with the second interference avoidance request.

9. The BS of claim 8, wherein the processor is further configured to, in response to receipt of an IAREP message indicating non-compliance with the first interference avoidance request, determine whether to use at least a portion of the determined resources via an opportunistic transmission or low code rate transmission.

10. The BS of claim 8, wherein the processor is further configured to, in response to receipt of an IAREP message indicating non-compliance with the first interference avoidance request, at least one of:

switch a transmit and receive beam pair to an alternative beam transmit and receive pair with reduced interference, switch to another parent BS, transmit in a protected mode with a low coding rate, and perform random or deterministic backoff, depending on link priority or data quality of service class, and channel sensing prior to transmission.

11. A method for operating a base station (BS) in a wireless communication network, the method comprising:

receiving a neighbor discovery signal block (NDSB) from a neighbor BS in the wireless communication network;

generating measurement information based on the NDSB;

generating at least one path metric for the neighbor BS based on the generated measurement information;

determining whether the neighbor BS is an interferer neighbor BS based on comparison of the at least one path metric to a first threshold and whether the neighbor BS is a candidate parent BS based on comparison of the at least one path metric to a second threshold; and updating network information maintained at the BS based on the determination of whether the neighbor BS is the interferer neighbor BS.

12. The method of claim 11, wherein:

the generating the measurement information comprises performing measurements for transmit and receive beam pairs between the BS and the neighbor BS based on reference signals included in the NDSB;

the generating the path metric for the neighbor BS comprises generating path metrics for the transmit and receive beam pairs using the measurements and information included in the NDSB; and the determination of whether the neighbor BS as the interferer neighbor BS is based on the path metrics for the transmit and receive beam pairs.

13. The method of claim 12, wherein the network information is maintained in one or more tables that include BS identifiers, identifiers for the transmit and receive beam pairs, and the path metrics for the transmit and receive beam pairs.

14. The method of claim 13, further comprising:

transmitting, to a central network entity, the one or more tables or updates to the one or more tables; and receiving, from the central network entity, routing and scheduling information for data transmission and reception by the BS.

15. The method of claim 14, wherein:

the one or more tables include an interference table and a candidate parent table, and the routing and scheduling information is determined, based on a conflict graph for the transmit and receive beam pairs in the interference table and transmit and receive beam pairs in the candidate parent table, to reduce BS neighbor interference in the wireless communication network.

16. The method of claim 11, further comprising:

receiving a second NDSB from a second neighbor BS in the wireless communication network, wherein the generating of the measurement comprises generating second measurement information based on the second NDSB, and wherein the generating of the at least one path metric comprises generating a second path metric for the second neighbor BS based on the generated second measurement information;

determining whether the second neighbor BS is the candidate parent BS based on comparison of the second path metric to a second threshold; and based on the determining that the second neighbor BS is the candidate parent BS:

determining a plurality of transmit and receive beam pairs for association with the second neighbor BS;

updating the network information maintained at the BS;

comparing the second path metric for the candidate parent BS to a path metric for a current parent BS of the BS; and initiating handover to the candidate parent BS based on the second path metric for the candidate parent BS exceeding the path metric for the current parent BS of the BS by a third threshold amount, wherein the third threshold amount is fixed or adaptive.

17. The method of claim 11, wherein:

the network information maintained at the BS includes beam identifiers for beams of interferer neighbor BSs in an interference table, and the method further comprises identifying resources for the BS to use based on the beam identifiers for the beams of the interferer neighbor BSs by:

determining resources to use on beams that do not have interferer neighbor BSs in the interference table, and determining resources to use via an opportunistic transmission or low code rate transmission on the beams that have interferer neighbor BSs in the interference table.

18. The method of claim 11, wherein the network information maintained at the BS includes a list of interferer neighbor BSs, the method further comprising:

determining resources for the BS to use;

transmitting, to the interferer neighbor BSs in the list, an interference avoidance request (IAREQ) message including a first interference avoidance request for the determined resources;

receiving an IAREQ message from a neighboring BS including a second interference avoidance request;

determining whether the BS will comply with the second interference avoidance request based on information in the received IAREQ message, a transmission pattern of the BS, and a beam priority level for beams of the BS;

transmitting, to the neighboring BSs, an interference avoidance response (IAREP) message indicating whether the BS will comply with the second interference avoidance request;

receiving one or more IAREP messages indicating whether one or more of the interferer neighbor BSs, respectively, will comply with the first interference avoidance request; and modifying the resources used by the BS based on the determination of whether to comply with the second interference avoidance request.

19. The method of claim 18, further comprising, in response to receipt of an IAREP message indicating non-compliance with the first interference avoidance request, determining whether to use at least a portion of the determined resources via an opportunistic transmission or low code rate transmission.

20. The method of claim 18, further comprising, in response to receipt of an IAREP message indicating non-compliance with the first interference avoidance request, at least one of:

switching a transmit and receive beam pair to an alternative beam transmit and receive pair with reduced interference;

switching to another parent B S;

transmitting in a protected mode with a low coding rate; and performing random or deterministic backoff, depending on a link priority or data quality of service class, and channel sensing prior to transmission.

* * * * *